(12) United States Patent
Saiwai et al.

(10) Patent No.: US 10,716,155 B2
(45) Date of Patent: Jul. 14, 2020

(54) RADIO TERMINAL

(71) Applicant: KYOCERA CORPORATION, Kyoto (JP)

(72) Inventors: Takahiro Saiwai, Yokohama (JP); Noriyoshi Fukuta, Inagi (JP); Kugo Morita, Yokohama (JP)

(73) Assignee: KYOCERA Corporation, Kyoto (JP)

(*) Notice: Subject to any disclaimer, the term of this patent is extended or adjusted under 35 U.S.C. 154(b) by 169 days.

(21) Appl. No.: 16/076,335

(22) PCT Filed: Jan. 30, 2017

(86) PCT No.: PCT/JP2017/003105
§ 371 (c)(1),
(2) Date: Aug. 8, 2018

(87) PCT Pub. No.: WO2017/138378
PCT Pub. Date: Aug. 17, 2017

(65) Prior Publication Data
US 2019/0053305 A1 Feb. 14, 2019

(30) Foreign Application Priority Data
Feb. 8, 2016 (JP) ................. 2016-022242

(51) Int. Cl.
H04W 76/14 (2018.01)
H04W 16/26 (2009.01)
H04L 5/00 (2006.01)
H04W 92/18 (2009.01)
H04W 76/28 (2018.01)
H04W 76/11 (2018.01)
H04W 8/00 (2009.01)
H04W 64/00 (2009.01)
(Continued)

(52) U.S. Cl.
CPC .............. H04W 76/14 (2018.02); H04L 5/00 (2013.01); H04W 8/005 (2013.01); H04W 16/26 (2013.01); H04W 64/003 (2013.01); H04W 72/0406 (2013.01); H04W 76/11 (2018.02); H04W 76/28 (2018.02); H04W 92/18 (2013.01); H04W 88/04 (2013.01)

(58) Field of Classification Search
CPC ..... H04W 76/14; H04W 76/28; H04W 76/11; H04W 8/005; H04W 64/003; H04W 92/18
See application file for complete search history.

(56) References Cited

U.S. PATENT DOCUMENTS

2016/0338127 A1* 11/2016 Matsumoto ....... H04W 72/0406

OTHER PUBLICATIONS

Ericsson, Sidelink Resource Allocation in V2X, 3GPP TSG-RAN WG2#93 R2-161566, Feb. 2016 (Year: 2016).*

(Continued)

Primary Examiner — Siming Liu
(74) Attorney, Agent, or Firm — Studebaker & Brackett PC

(57) ABSTRACT

A radio terminal according to one embodiment comprises a controller configured to be capable of relaying traffic between another radio terminal and a network by a proximity service. The controller performs a control for transmitting first information and second information, in a sidelink. The first information is used for identifying a location of a radio resource in which the second information is arranged. The second information is used to identify a location of a radio resource for requesting the relay by the proximity 20 Claims, 13 Drawing Sheets

(51) Int. Cl.
*H04W 72/04* (2009.01)
*H04W 88/04* (2009.01)

(56) References Cited

OTHER PUBLICATIONS

3rd Generation Partnership Project; Technical Specification Group Radio Access Network; Evolved Universal Terrestrial Radio Access (E-UTRA) and Evolved Universal Terrestrial Radio Access Network (E-UTRAN); 3GPP TS36.300 V13.2.0; Dec. 2015; pp. 1-290; Release 13; 3GPP Organizational Partners.

\* cited by examiner

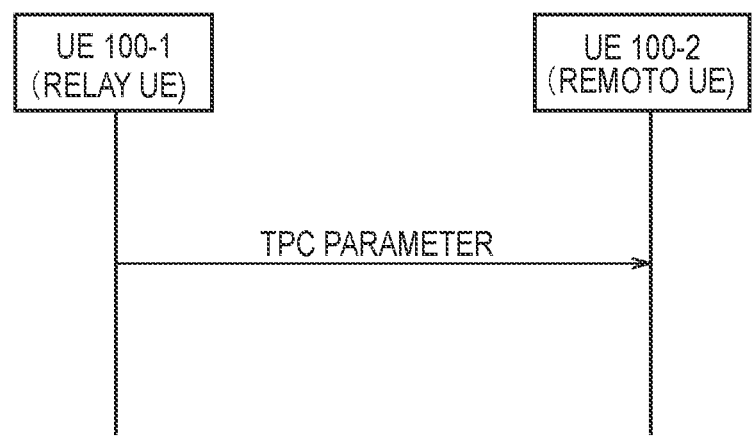
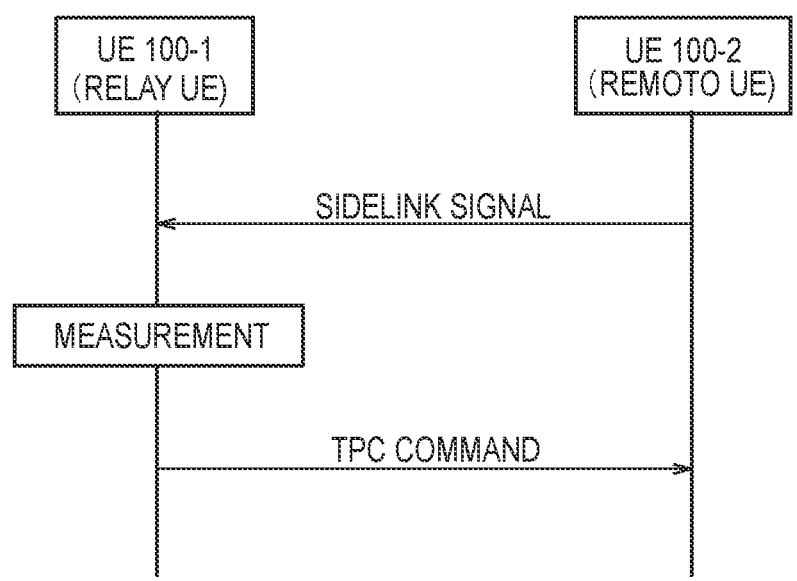

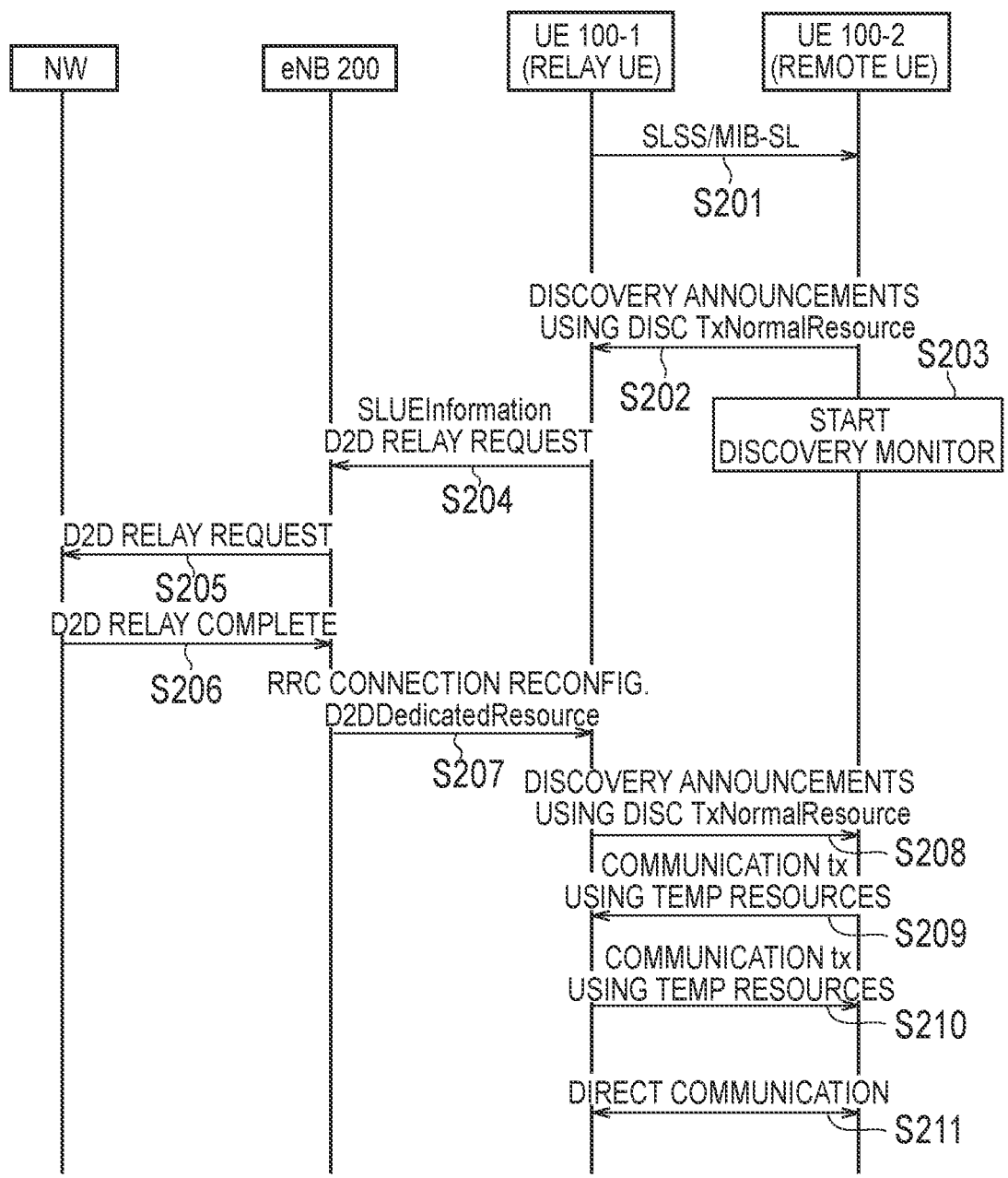

RADIO TERMINAL

TECHNICAL FIELD

The present disclosure relates to a radio terminal used in a communication system.

BACKGROUND ART

In 3GPP (3rd Generation Partnership Project), which is a project aiming to standardize a mobile communication system, the specifications of proximity-based services (ProSes) have been designed (see Non Patent Document 1).

In the Prose, a specific radio terminal (ProSe UE-to-Network relay) can relay traffic between another radio terminal (remote UE) and a network.

PRIOR ART DOCUMENT

Non-Patent Document

Non Patent Document 1: 3GPP Technical Specification "TS 36.300 V13.2.0" Jan. 13, 2016

SUMMARY

A radio terminal according to one embodiment comprises a controller configured to be capable of relaying traffic between another radio terminal and a network by a proximity service. The controller performs a control for transmitting first information and second information, in a sidelink. The first information is used for identifying a location of a radio resource in which the second information is arranged. The second information is used to identify a location of a radio resource for requesting the relay by the proximity A radio terminal according to one embodiment comprises a controller configured to execute a control for receiving first information and second information, in a sidelink, from another radio terminal configured to be capable of relaying traffic between the radio terminal and a network by a proximity service. The first information is used to identify a location of a radio resource in which the second information is arranged. The second information is used to identify a location of a radio resource for requesting the relay by the proximity

BRIEF DESCRIPTION OF THE DRAWINGS

FIG. 12 is a (fifth) diagram for describing the operation according to the embodiment.

FIG. 13 is a (sixth) diagram for describing the operation according to the embodiment.

FIG. 14 is a sequence chart for describing a first modification.

DESCRIPTION OF THE EMBODIMENT

Overview of Embodiment

Figure 1:
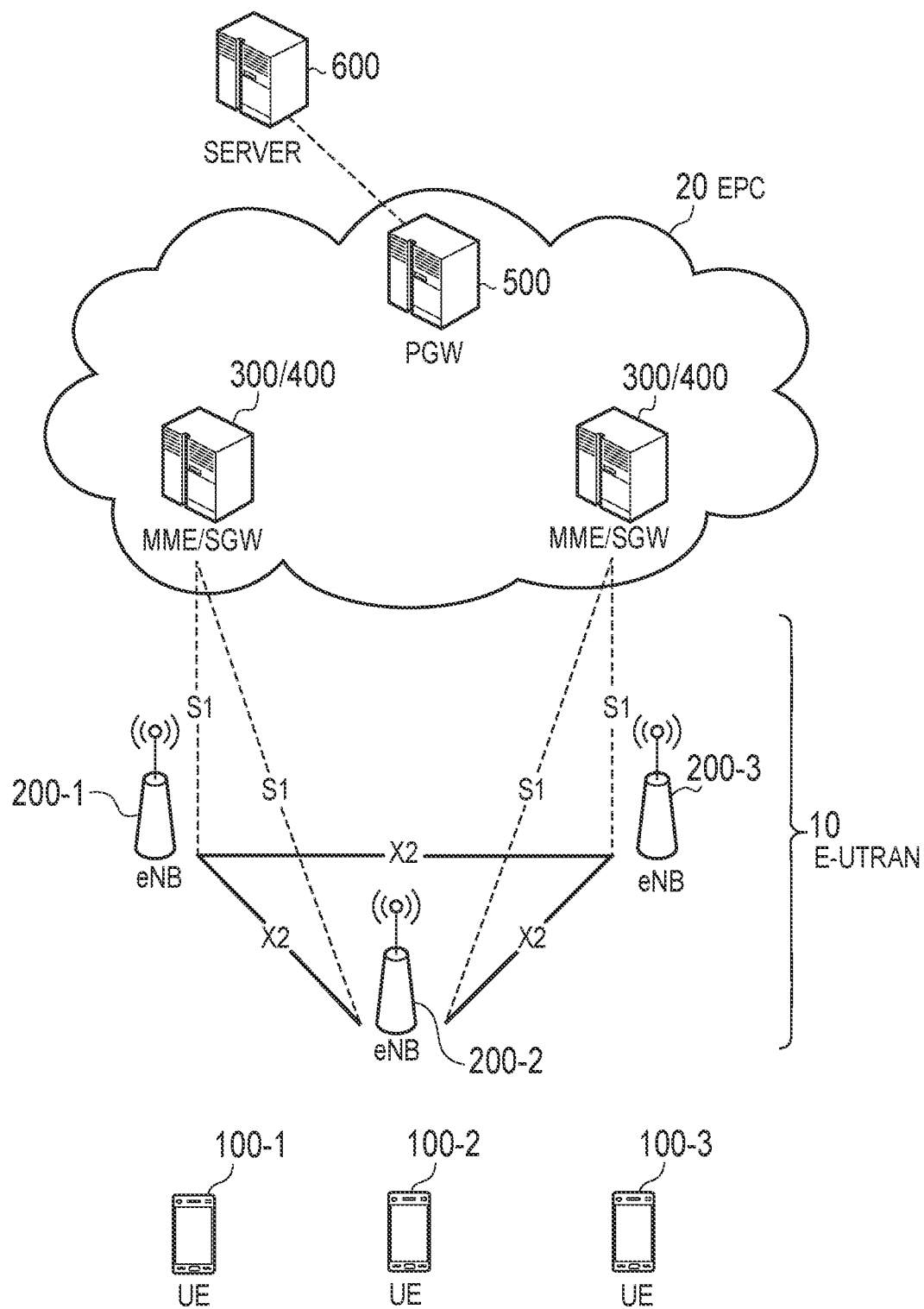
FIG. 1 is a diagram illustrating a configuration of an LTE system.

If convenience of a proximity-based service increases in the future, there is a possibility that a radio terminal is introduced that can only perform transmission and reception of a radio signal by the proximity-based service (sidelink operation), that is, a radio terminal that cannot perform transmission and reception of the radio signal in an uplink and a downlink (cellular communication).

In the current specification, only a radio terminal capable of performing cellular communication has been considered to utilize the proximity-based service. Therefore, a specification for the new radio terminal that cannot perform the cellular communication is not defined, and thus, the new radio terminal may not be able to properly execute the sidelink operation.

A radio terminal according to one embodiment comprises a controller configured to be capable of relaying traffic between another radio terminal and a network by a proximity service. The controller performs a control for transmitting first information and second information, in a sidelink. The first information is used for identifying a location of a radio resource in which the second information is arranged. The second information is used to identify a location of a radio resource for requesting the relay by the proximity service.

The controller may execute a control for receiving, from the another radio terminal, a request for the relay transmitted by using the radio resource.

The controller may perform a control for transmitting, to a base station, information indicating a desire for the relay, in response to reception of the request for the relay.

The radio resource may include a plurality of respectively different small resources. Each of the plurality of small resources may be associated with a respectively different temporary identifier. The request for the relay may include a temporary identifier associated with a small resource used for transmitting the request for the relay. The controller may execute a control for transmitting a response to the request for the relay to the another radio terminal. The response may include the temporary identifier included in the request for the relay.

The controller may execute a control for transmitting a response to the request for the relay to the another radio terminal. The response may include information for adjusting a transmission timing to the radio terminal from the another radio terminal.

The controller may execute, before transmitting the first information, a control for receiving third information in the sidelink from the another radio terminal or a base station. The controller may start, in response to receipt of the third information, a control for transmitting the first information.

The controller may be individually allocated, from a base station, with a dedicated resource used in the sidelink. The controller may share the dedicated resource with the another radio terminal.

A plurality of control regions used for transmitting control information may be arranged in a time direction. The control information may be used for identifying a location of a radio resource in which user data transmitted in a sidelink is arranged. The controller may select a control region used for transmitting the control information out of the plurality of control regions, according to a sidelink DRX (Discontinuous Reception) operation of the another radio terminal. The sidelink DRX operation may be an operation for discontinuously monitoring, by the another radio terminal, the plurality of control regions.

The controller may execute a control for transmitting power control information to the another radio terminal. The power control information may include parameter information for controlling a transmission power of a sidelink signal to the radio terminal from the another radio terminal. The parameter information may be decided according to a received power of the sidelink signal from the radio terminal to the another radio terminal.

The controller may execute a control for transmitting power control information to the another radio terminal. The power control information may include command information for controlling a transmission power of a sidelink signal to the radio terminal from the another radio terminal. The command information may be decided according to a received power of the sidelink signal.

A radio terminal according to one embodiment comprises a controller configured to execute a control for receiving first information and second information, in a sidelink, from another radio terminal configured to be capable of relaying traffic between the radio terminal and a network by a proximity service. The first information is used to identify a location of a radio resource in which the second information is arranged. The second information is used to identify a location of a radio resource for requesting the relay by the proximity service.

The controller may execute a control for transmitting a request for the relay, to the another radio terminal, by using the radio resource.

The radio resource may include a plurality of respectively different small resources. Each of the plurality of small resources may be associated with a respectively different temporary identifier. The controller may include a temporary identifier associated with a small resource used for transmitting a request for the relay, into the request for the relay.

The controller may execute a control for receiving a response to the request for the relay from the another radio terminal. The response may include the temporary identifier included in the request for the relay.

The controller may executes a control for receiving a response to the request for the relay from the another radio terminal. The response may include information for adjusting a transmission timing to the another radio terminal from the radio terminal.

The controller may execute, before receiving the first information, a control for transmitting third information in the sidelink. The controller may receive the first information from the another radio terminal having received the third information.

The controller may share a dedicated resource used in the sidelink, with the another radio terminal. The dedicated resource may be a radio resource allocated individually from a base station to the another radio terminal.

A plurality of control regions used for transmitting control information may be arranged in a time direction. The control information may be used for identifying a location of a radio resource in which user data transmitted in a sidelink is arranged. The controller executes a sidelink DRX (Discontinuous Reception) operation for discontinuously monitoring the plurality of control regions.

The controller may execute a control for receiving power control information from the another radio terminal. The power control information may include parameter information for controlling a transmission power of a sidelink signal from the radio terminal to the another radio terminal. The parameter information may be decided according to a received power of the sidelink signal from the another radio terminal to the radio terminal.

The controller may executes a control for receiving power control information from the another radio terminal. The power control information may include command information for controlling a transmission power of a sidelink signal from the radio terminal to the another radio terminal. The command information may be decided according to a received power of the sidelink signal.

Embodiment (Mobile Communication System)

The configuration of the mobile communication system according to the embodiment will be described. FIG. 1 is a diagram illustrating a configuration of a Long Term Evolution (LTE) system.

As illustrated in FIG. 1, the LTE system includes a User Equipment (UE) 100, an Evolved-Universal Terrestrial Radio Access Network (E-UTRAN) 10, and an Evolved Packet Core (EPC) 20.

The UE 100 corresponds to a radio terminal. The UE 100 is a mobile communication apparatus. The UE 100 performs radio communication with a cell (later described eNB 200). The configuration of the UE 100 will be described later.

The E-UTRAN 10 corresponds to a radio access network. The E-UTRAN 10 includes an evolved Node-B (eNB) 200. The eNB 200 corresponds to a base station. The eNBs 200 are connected to each other via an X2 interface. The configuration of the eNB 200 will be described later.

The eNB 200 manages one or a plurality of cells. The eNB 200 performs radio communication with the UE 100 that has established connection with cells managed by the eNB 200. The eNB 200 has a radio resource management (RRM) function, a routing function of user data (hereinafter, simply referred to as "data"), a measurement control function for mobility control and scheduling, and the like. The "cell" is used as a term indicating the minimum unit of a radio communication area. The "cell" is also used as a term indicating a function of performing radio communication with the UE 100.

The EPC 20 corresponds to a core network. The EPC 20 may constitute a network together with the E-UTRAN 10. The EPC 20 includes an MME (Mobility Management Entity) 300, an SGW (Serving Gateway) 400, and a PGW (Packet Data Network Gateway) 500.

The MME 300 performs, for example, various kinds of mobility control for the UE 100. The SGW 400 performs, for example, data transfer control. The MME 300 and the SGW 400 are connected to the eNB 200 via a S1 interface. The PGW 500 performs, for example, control of relaying user data from an external network (and to an external network).

In the external network, a server 600 is provided. The Server 600 is, for example, a ProSe application server (ProSe Application Server). Server 600 (ProSe Application Server) manages identifiers used in ProSe.

The Server 600 may have a ProSe function. The ProSe function is a logical function used for network related operation required for ProSe. The ProSe function plays a different role for each feature of ProSe. The Server 600 may be a network device having only the ProSe function.

Figure 2:
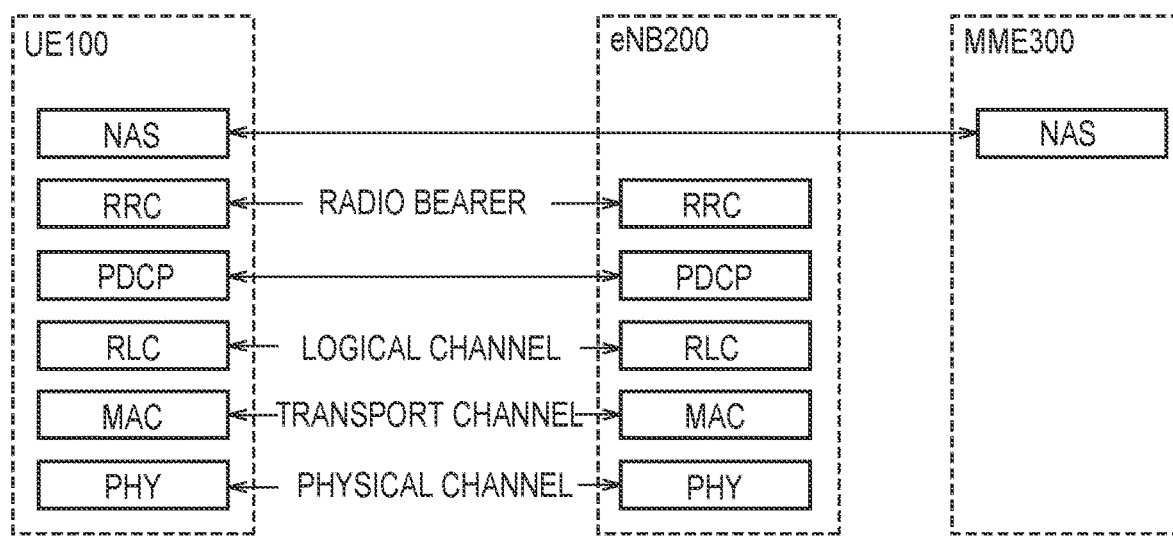
FIG. 2 is a protocol stack diagram of a radio interface in the LTE system.

FIG. 2 is a diagram illustrating protocol stack of a radio interface in the LTE system. As illustrated in FIG. 2, a radio interface protocol is separated into first to third layers of an Open Systems Interconnection (OSI) reference model. The first layer is a physical (PHY) layer. The second layer includes a Medium Access Control (MAC) layer, a Radio Link Control (RLC) layer, and a Packet Data Convergence Protocol (PDCP) layer. The third layer includes a Radio Resource Control (RRC) layer.

The physical layer performs encoding/decoding, modulation/demodulation, antenna mapping/demapping, and resource mapping/demapping. Between the physical layer of the UE 100 and the physical layer of the eNB 200, data and control signal are transferred via a physical channel.

The MAC layer performs data priority control, retransmission processing using a hybrid automatic repeat request (ARQ) (HARQ), a random access procedure, and the like. Between the MAC layer of the UE 100 and the MAC layer of the eNB 200, data and control signal are transferred via a transport channel. The MAC layer of the eNB 200 includes a scheduler (MAC scheduler). The scheduler decides a transport format (transport block size and modulation and coding schemes (MCS)) of uplink and downlink, and a resource block to be allocated to the UE 100.

The RLC layer transfers data to an RLC layer on a reception side using the functions of the MAC layer and the physical layer. Between the RLC layer of the UE 100 and the RLC layer of the eNB 200, data and control information are transferred via a logical channel.

The PDCP layer performs header compression/decompression, and encryption/decryption.

The RRC layer is defined only in a control plane handling control signal. Between the RRC layer of the UE 100 and the RRC layer of the eNB 200, messages (RRC messages) for various configurations are transferred. The RRC layer controls the logical channel, the transport channel, and the physical channel in response to establishment, re-establishment, and release of a radio bearer. If there is connection (RRC connection) between the RRC of the UE 100 and the RRC of the eNB 200, the UE 100 is in an RRC connected state. If there is not a connection (RRC connection) between the RRC of the UE 100 and the RRC of the eNB 200, the UE 100 is in an RRC idle state.

A non-access stratum (NAS) layer located above the RRC layer performs, for example, session management, mobility management, and the like.

Figure 3:
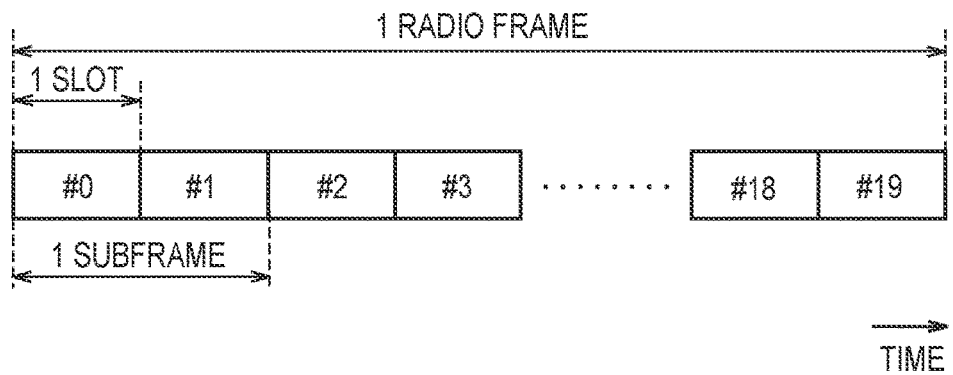
FIG. 3 is a configuration diagram of a radio frame used in the LTE system.

FIG. 3 is a configuration diagram of a radio frame used in the LTE system. In the LTE system, Orthogonal Frequency Division Multiple Access (OFDMA) is applied to downlink. In the LTE system, Single Carrier Frequency Division Multiple Access (SC-FDMA) is applied to uplink.

As illustrated in FIG. 3, a radio frame is constituted by ten subframes arranged in a time direction. Each subframe is constituted by two slots arranged in the time direction. The length of each subframe is 1 ms, and the length of each slot is 0.5 ms. Each subframe includes a plurality of resource blocks (RBs) in a frequency direction. Each subframe includes a plurality of symbols in the time direction. Each resource block includes a plurality of subcarriers in the frequency direction. One resource element (RE) is constituted by one symbol and one subcarrier. Radio resources (time/frequency resources) are allocated to the UE 100. In the frequency direction, radio resources (frequency resources) are constituted by resource blocks. In the time direction, radio resources (time resources) are constituted by subframes (or slots).

In the downlink, the section of the first several symbols of each subframe is an area that can be used as a physical downlink control channel (PDCCH) for transmitting a downlink control signal. The remaining part of each subframe is an area that can be used as a physical downlink shared channel (PDSCH) for transmitting downlink data.

In the uplink, both end portions in the frequency direction in each subframe are areas usable as a Physical Uplink Control Channel (PUCCH) for transmitting an uplink control signal. The remaining part of each subframe is an area that can be used as a physical uplink shared channel (PUSCH) for transmitting uplink data.

(Wireless Terminal)

Figure 4:
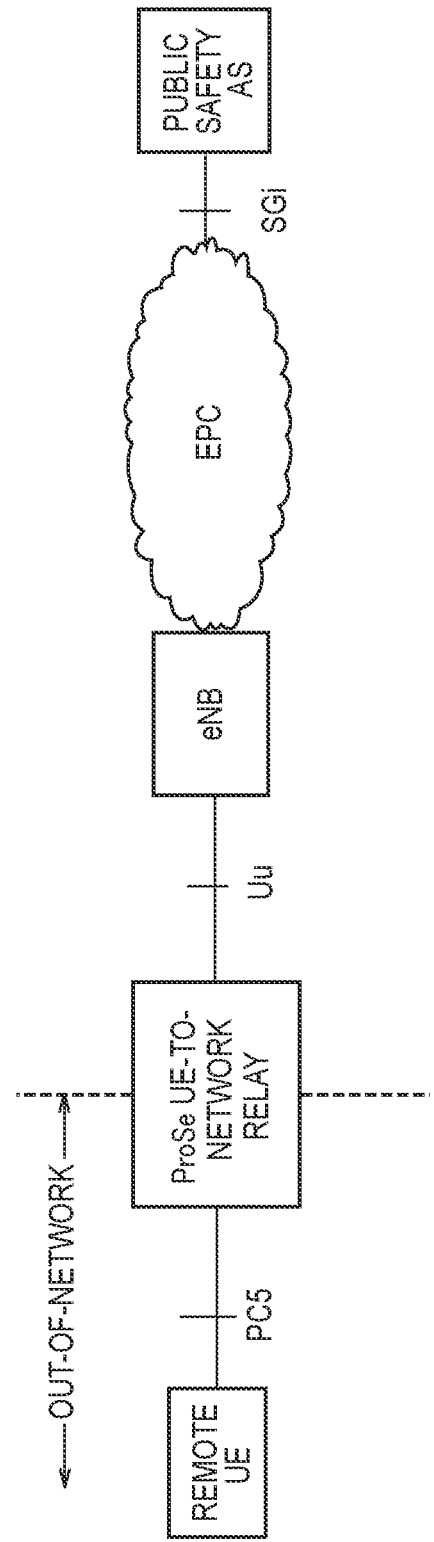
FIG. 4 is a diagram for describing a relay by a proximity-based service.

The UE 100 (wireless terminal) according to the embodiment will be described. FIG. 4 is a block diagram of the UE 100. As shown in FIG. 4, the UE 100 includes a receiver (receiver) 110, a transmitter (transmitter) 120, and a controller (controller) 130. The receiver 110 and the transmitter 120 may be integrated transceivers (transceivers).

(Proximity-Based Service)

Proximity-based services (ProSes) will be described. The proximity-based service is a service that can be provided by a 3GPP system, based on UEs in the vicinity of each other.

In ProSe, various types of radio signals are transmitted and received via a direct radio link between nodes (for example, between UEs), without passing through the eNB 200. The direct radio link in the ProSe is called "Sidelink".

The sidelink may be an interface for sidelink communication and a sidelink discovery (for example, an interface between the UE and the UE). The sidelink communication is a function (AS functionality) for enabling ProSe direct communication (hereinafter, appropriately referred to as "direct communication"). The sidelink discovery is a function (AS functionality) for enabling a ProSe direct discovery (hereinafter, appropriately referred to as "direct discovery").

The sidelink corresponds to a PC5 interface. The PC5 is a reference point between ProSe usable UEs (ProSe-enabled UE) used for a control plane and a user plane for the ProSe direct discovery, the ProSe direct communication, and a ProSe UE-to-Network relay.

"Direct discovery", "direct communication", and "UE-to-Network relay" modes are defined for the ProSe. The "UE-to-Network relay" will be described later.

The direct discovery is a mode of searching a partner destination by directly transmitting, between the UEs, a discovery message (discovery signal) that does not specify a specific destination. The direct discovery is a procedure for discovering another UE in the vicinity of the UE by using a direct radio signal in E-UTRA (Evolved Universal Terrestrial Radio Access) via the PC5. Alternatively, the direct discovery is a procedure adopted by a UE 100 capable of executing the proximity-based service for discovering another UE 100 capable of executing the proximity-based service by using only a capability of the two UEs 100 with the help of the E-UTRA technology. The direct discovery is supported only if the service is provided to the UE 100 by the E-UTRAN (eNB 200 (cell)). The service can be provided by the E-UTRAN if the UE 100 is either connected to the cell (eNB 200) or exists in the cell.

A resource allocation type for the transmission (announcement) of the discovery message (discovery signal)

includes "type 1" and "type 2 (type 2B)". In the "type 1", the UE 100 selects the radio resource. In the "type 2 (type 2B)", the eNB 200 allocates the radio resource to the UE 100.

A "Sidelink Direct Discovery" protocol stack includes a physical (PHY) layer, a MAC layer, and a ProSe protocol. Between the physical layer of a UE (A) and the physical layer of a UE (B), a discovery signal is transmitted via a physical channel called a physical sidelink discovery channel (PSDCH). Between the MAC layer of the UE (A) and the MAC layer of the UE (B), a discovery signal is transmitted via a transport channel called a sidelink discovery channel (SL-DCH).

The direct communication is a mode in which data is directly transmitted between the UEs by specifying a specific destination (destination group). The direct communication is communication between two or more UEs capable of executing the proximity-based services through user plane transmission in which the E-UTRA technology is used via a path without passing through any network node.

A resource allocation type of the direct communication includes "mode 1" and "mode 2". In the "mode 1", the eNB 200 specifies the radio resource of the direct communication. In the "mode 2", the UE 100 selects the radio resource of the direct communication.

A direct communication protocol stack includes a physical (PHY) layer, a MAC layer, an RLC layer, and a PDCP layer. Between the physical layer of the UE (A) and the physical layer of the UE (B), a control signal is transmitted via a physical sidelink control channel (PSCCH), and data is transmitted via a physical sidelink shared channel (PSSCH). A synchronization signal and the like may be transmitted via a physical sidelink broadcast channel (PSBCH). Between the MAC layer of the UE (A) and the MAC layer of the UE (B), data is transmitted via a transport channel called a sidelink shared channel (SL-SCH). Between the RLC layer of the UE (A) and the RLC layer of the UE (B), data is transmitted via a logical channel called a sidelink traffic channel (STCH).

(Relay Utilizing Proximity-Based Service)

The UE-to-Network relay will be described below by using FIG. 4. FIG. 4 is a diagram for describing the UE-to-Network relay according to the embodiment.

In FIG. 4, a remote UE is a UE located outside the network (Outof-Network), for example. That is, the remote UE is located outside a coverage of the cell. The remote UE may be located within the coverage of the cell. Therefore, the remote UE is a UE 100 to which a service is not directly provided by the E-UTRAN 10 (UE 100 which is not served by the E-UTRAN 10). The remote UE 100 can communicate with a Packet Data Network (PDN) via a relay UE described later. The remote UE may be a UE for public safety (ProSe-enabled Public Safety UE).

The "ProSe-enabled Public Safety UE" is configured to be allowed for use in public safety by an HPLMN. The "ProSe-enabled Public Safety UE" can utilize the proximity-based services, and supports the procedures in the proximity-based services as well as a specific capability for public safety. For example, the "ProSe-enabled Public Safety UE" transmits information for public safety through the proximity-based services. The information for public safety includes, for example, information on a disaster (such as an earthquake and a fire) and information used by a fire official or a police official.

The remote UE is provided with a ProSe relay service from the relay UE, as described later. The UE-to-Network relay is executed between the remote UE provided with the ProSe relay service and the relay UE providing the ProSe relay service.

For the remote UE, the relay UE (ProSe UE-to Network Relay) provides the ProSe relay service. Specifically, for the remote UE, the relay UE provides service continuity of the communication with a packet data network. Therefore, the relay UE relays data (unicast traffic) between the remote UE and the network. The relay UE relays data (traffic) of the remote UE through the proximity-based services (direct communication). Specifically, the relay UE relays data (uplink traffic) received from the remote UE via the PC5 interface to the eNB 200 via a Uu interface (LTE-Uu) or a Un interface (LTE-Un). The relay UE relays data (downlink traffic) received from the eNB 200 via the Uu interface or the Un interface to the remote UE via the PC5 interface. The relay UE is located only within the network (within the coverage of the cell).

The relay UE can provide a comprehensive function capable of relaying any type of traffic related to the communication for public safety.

The relay UE and the remote UE can transmit data and control signals between the physical layers. Similarly, the relay UE and the remote UE can transmit data and control signals between the MAC layers, between the RLC layers, and between the PDCP layers. In addition, the relay UE may have an IP-Relay layer as an upper layer of the PDCP layer. The remote UE may also have an IP layer as an upper layer of the PDCP layer. The relay UE and the remote UE can transmit data and control signals between the IP-Relay layer and the IP layer. The relay UE can transmit data between the IP-Relay layer and the IP layer of the IP-GW 350.

In an AS layer (Access Stratum), the relay UE can transmit data (traffic) to the remote UE by using broadcast. In the AS layer, the relay UE may transmit data to the remote UE by using unicast. If the UE-to-Network relay is executed by using broadcast, a feedback in the AS layer need not be performed between the relay UE and the remote UE. In this case, a feedback in the NAS layer (Non Access Stratum) may be performed between the relay UE and the remote UE. If the UE-to-Network relay is executed by using unicast, the feedback in the AS layer may be performed.

(Radio Terminal)

A UE 100 (radio terminal) according to the embodiment will be described. The UE 100 according to the embodiment includes (A) UE having a cellular communication function and (B) UE not having the cellular communication function. The UE not having the cellular communication function has a sidelink function. Hereinafter, the UE not having the cellular communication function may be referred to as "SL-UE".

(A) UE Having Cellular Communication Function

Figure 5:
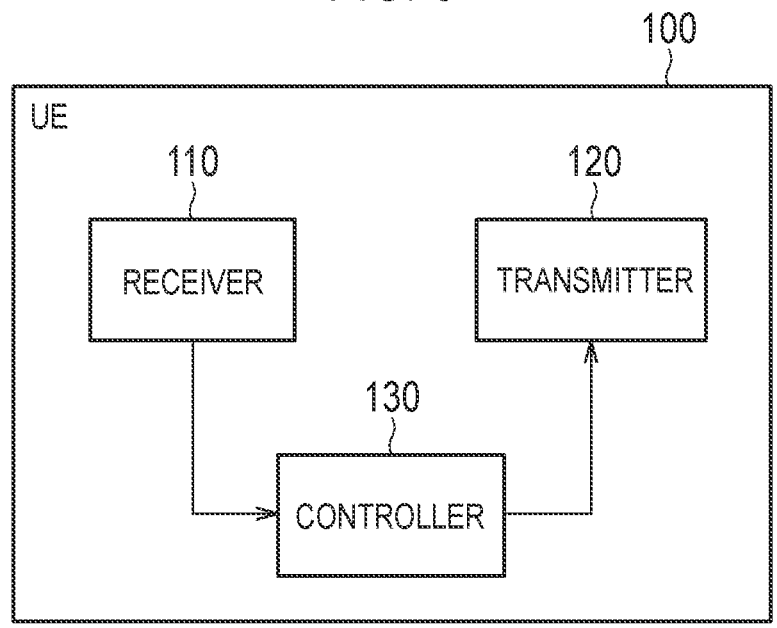
FIG. 5 is a block diagram of a UE 100.

The UE 100 having the cellular communication function will be described. FIG. 5 is a block diagram of the UE 100. As illustrated in FIG. 5, the UE 100 includes a receiver 110, a transmitter 120, and a controller 130. The receiver 110 and the transmitter 120 may be an integrated transceiver. The receiver 110, the transmitter 120, and the controller 130 are used for executing the cellular communication and the sidelink operation.

The receiver 110 performs various types of receptions under the control of the controller 130. The receiver 110 includes an antenna. The receiver 110 converts a radio signal received by the antenna into a baseband signal (reception signal). The receiver 110 outputs the baseband signal to the controller 130.

The transmitter 120 performs various types of transmissions under the control of the controller 130. The transmitter 120 includes an antenna. The transmitter 120 converts the baseband signal (transmission signal) output from the controller 130 into a radio signal. The transmitter 130 transmits the radio signal from the antenna.

The controller 130 performs various types of controls in the UE 100. The controller 130 includes a processor and a memory. The memory stores a program to be executed by the processor, and information to be used for a process by the processor. The processor includes a baseband processor and a CPU (Central Processing Unit). The baseband processor performs, for example, modulation and demodulation, as well as coding and decoding, of the baseband signal. The CPU executes a program stored in the memory to perform various types of processes. The processor may include a codec configured to perform encoding and decoding on sound and video signals. The processor executes various types of processes described later, and various types of communication protocols described above.

The UE 100 may include a GNSS receiver unit. The GNSS receiver unit can receive a GNSS signal to obtain location information indicating a geographical location of the UE 100. The GNSS receiver unit outputs the GNSS signal to the controller 130. The UE 100 may have a GPS function for acquiring the location information of the UE 100.

(B) UE not Having the Cellular Communication Function

An SL-UE 100 not having the cellular communication function will be described. The SL-UE 100 includes, similarly to the above-described UE 100, a receiver 110, a transmitter 120, and a controller 130. The receiver 110, the transmitter 120, and the controller 130 included in the SL-UE 100 are capable only of executing the sidelink operation, and the SL-UE 100 does not include a receiver and a transmitter capable of executing the cellular communication. Therefore, the receiver 110, the transmitter 120, and the controller 130 included in the SL-UE 100 execute an operation similar to that described above, however, the "radio signal" is a radio signal in the sidelink. In other respects, the receiver 110, the transmitter 120, and the controller 130 execute an operation similar to that described above.

The SL-UE 100 is a communication device wearable by a user (Wearable UE), for example. The SL-UE 100 may be a communication device for machine type communication (MTC: Machine Type Communication) that is communication without human intervention.

Unlike the existing UE 100, the SL-UE 100 may not require mounting of an existing SIM (Subscriber Identity Module Card). A SIM for the SL-UE (D2D SIM) may be mountable in the SLUE 100.

There is no need of mounting the existing SIM, and thus, the SL-UE 100 does not hold information configured via the network from the ProSe function (Pre-configured parameter).

For simplicity, a process executed by at least any one of the receiver 110, the transmitter 120, and the controller 130 included in the UE 100 (SL-UE 100) is described herein as a process (operation) executed by the UE 100.

(Base Station)

Figure 6:
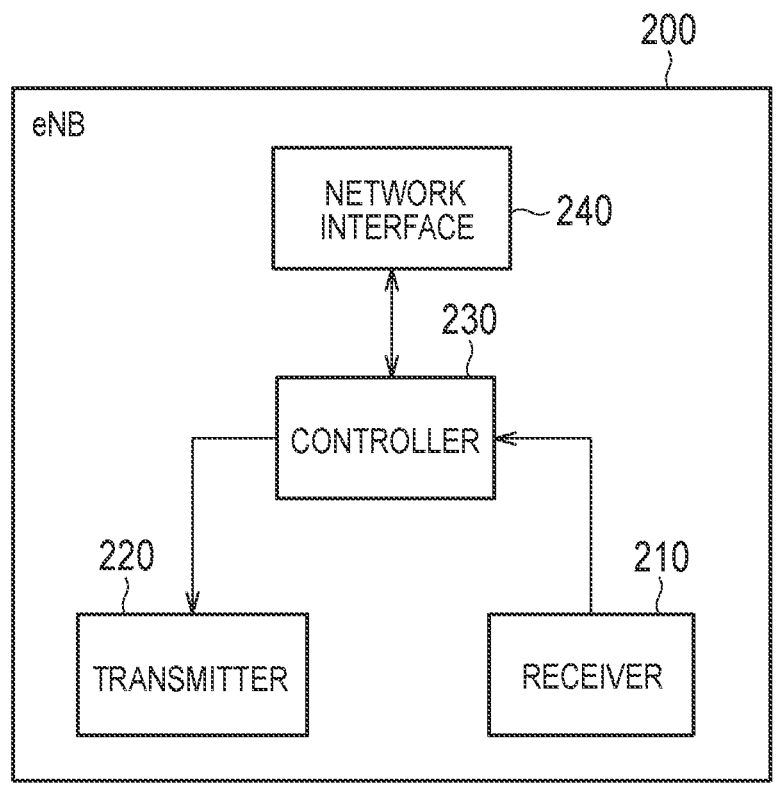
FIG. 6 is a block diagram of an eNB 200.

The eNB 200 (base station) according to the embodiment will be described. FIG. 6 is a block diagram of the eNB 200. As illustrated in FIG. 6, the eNB 200 includes a receiver 210, a transmitter 220, a controller 230, and a network interface 240. The transmitter 210 and the receiver 220 may be an integrated transceiver.

The receiver 210 performs various types of receptions under the control of the controller 230. The receiver 210 includes an antenna. The receiver 210 converts a radio signal received by the antenna into a baseband signal (reception signal). The receiver 210 outputs the baseband signal to the controller 230.

The transmitter 220 performs various types of transmissions under the control of the controller 230. The transmitter 220 includes an antenna. The transmitter 220 converts the baseband signal (transmission signal) output from the controller 230 into a radio signal. The transmitter 220 transmits the radio signal by the antenna.

The controller 230 performs various types of controls in the eNB 200. The controller 230 includes a processor and a memory. The memory stores a program to be executed by the processor, and information to be used for a process by the processor. The processor includes a baseband processor and a CPU. The baseband processor performs modulation and demodulation, coding and decoding, and the like, of the baseband signal. The CPU executes a program stored in the memory to perform various types of processes. The processor executes various types of processes described later, and various types of communication protocols described above.

The network interface 240 is connected to an adjacent eNB 200 via the X2 interface. The network interface 240 is connected to the MME 300 and the SGW 400 via the S1 interface. The network interface 240 is used in communication performed on the X2 interface and communication performed on the S1 interface, for example.

For simplicity, a process executed by at least any one of the transmitter 210, the receiver 220, the controller 230, and the network interface 240 included in the eNB 200 is described herein as a process (operation) executed by the eNB 200.

(Operation According to Embodiment)

Figure 7:
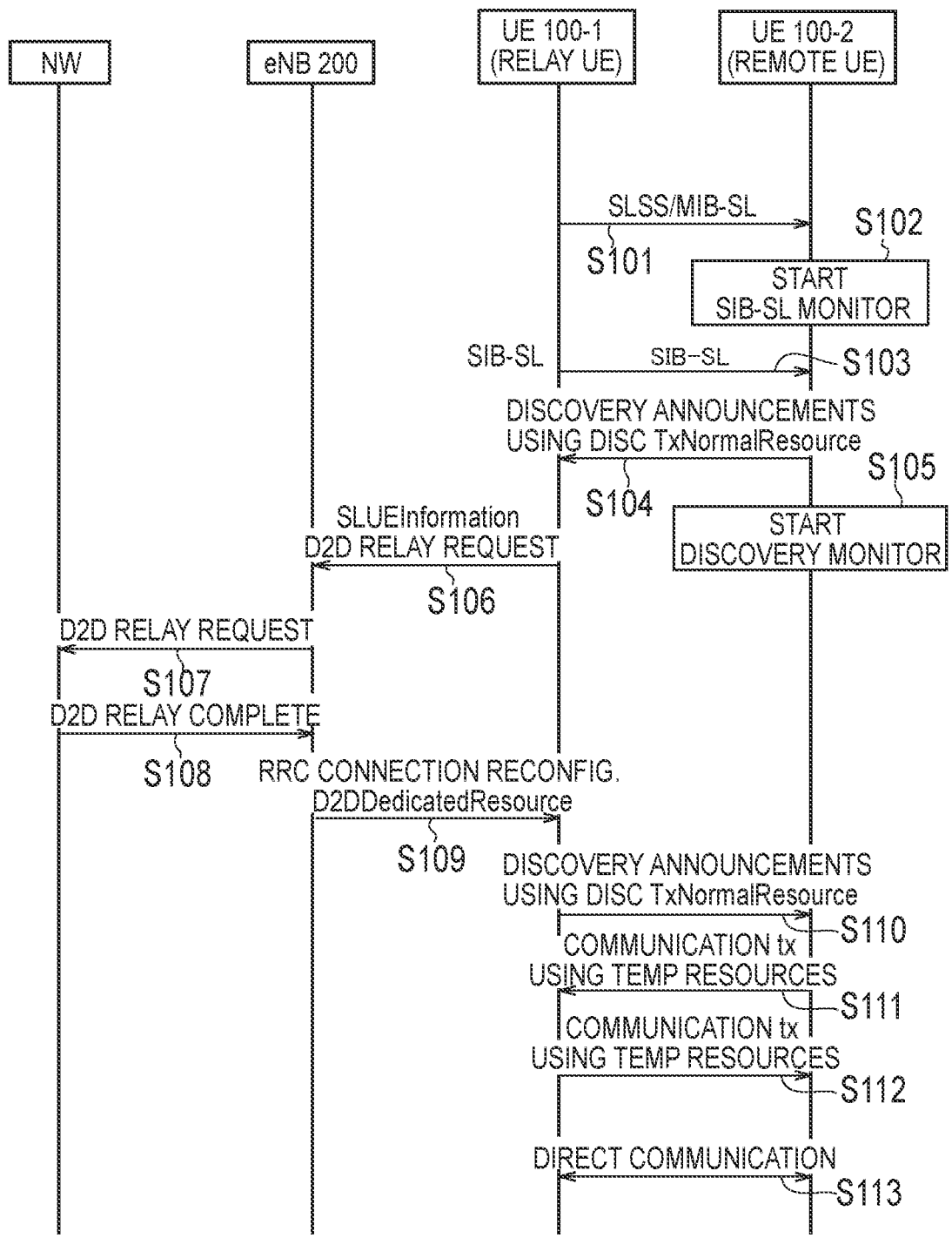
FIG. 7 is a sequence chart for describing an overview of a resumption procedure.

An operation according to the embodiment will be described by using FIG. 7 to FIG. 13. FIG. 7 is a sequence chart for describing the operation according to the embodiment. FIG. 8 to FIG. 13 are diagrams and charts for describing the operation according to the embodiment.

A UE 100-1 has a cellular communication function and a sidelink function. That is, the UE 100-1 is can execute a UE-to-network relay operation. The UE 100-1 exists in the cell managed by the eNB 200. The UE 100-1 is an RRC connected state. Alternatively, the UE 100-1 may be in an RRC idle state.

The UE 100-2 does not have the cellular communication function, but has the sidelink function. The UE 100-2 is the SL-UE 100. The UE 100-2 is the remote UE.

Hereinafter, the radio signal in the sidelink is transmitted and received by using a licensed band and/or an unlicensed band. Therefore, the UE 100-1 and the UE 100-2 may be UEs configured to support only the licensed band. The UE 100-1 and the UE 100-2 may be UEs supporting only the unlicensed band. The UE 100-1 and the UE 100-2 may be UEs configured to support both the licensed band and the unlicensed band. The licensed band is a frequency band for which a license is required. The licensed band, the unlicensed band used in the cellular communication is a frequency band for which the license is not required.

As illustrated in FIG. 7, in step S101, the UE 100-1 transmits a master information block SL (MIB-SL) message in the sidelink. The UE 100-1 may transmit a synchronization signal (SLSS) together with the MIB-SL message, in the sidelink.

The UE 100-1 may transmit the MIB-SL message (and the SLSS) periodically or aperiodically. The UE 100-1 may transmit, for example, the MIB-SL message at a constant factor of a minimum period X [ms] of the previously defined MIB-SL message (and the SLSS). If there are a plurality of transmission opportunities within a predetermined period Y [ms], for example, the UE 100-1 may randomly select an opportunity for transmitting the MIB-SL message from among the plurality of transmission opportunities.

The UE 100-1 may transmit the MIB-SL message regardless of whether there is the remote UE in the surroundings. The transmission period of the MIB-SL message before discovering the remote UE may be longer than the transmission period of the MIB-SL message after discovering the remote UE.

The UE 100-1 may be configured, by the eNB 200, with a plurality of periods for the MIB-SL message (and the SLSS). The eNB 200 may transmit configuration information for the MIB-SL message (and the SLSS) by a dedicated signaling. The eNB 200 may transmit the configuration information by a common signaling (for example, System Information Block (SIB) and the like).

The MIB-SL message is used for identifying a location of a radio resource in which a later-described system information block SL (SIB-SL) is arranged.

The MIB-SL message may include, for example, information for identifying a location of the radio resource in which the SIB-SL is arranged. The MIB-SL message may include information for specifying a time location (for example, a subframe) of the radio resource in which the SIB-SL is arranged. The MIB-SL message may include information for specifying a frequency location of the radio resource in which the SIB-SL is arranged.

These pieces of information are information different from "directFrameNumber", "directSubframeNumber", and "sl-Bandwidth" included in the MIB-SL message. The "directFrameNumber" indicates a frame number in which the SLSS and an SL-BCH (Sidelink Broadcast Channel) are transmitted. The "directSubframeNumber" indicates a subframe in a frame corresponding to the "directFrameNumber". The "sl-Bandwidth" is a parameter of a frequency bandwidth configuration used for the sidelink.

The SIB-SL may be capable of identifying the location of the radio resource in which the SIB-SL is arranged, from the location of the MIB-SL message (that is, the location of the radio resource in which the MIB-SL is arranged). For example, the frequency band in which the MIB-SL message is transmitted may be the same as the frequency band in which the SIB-SL is transmitted. The SIB-SL may be located after a time period previously specified from the time location of the MIB-SL message has elapsed.

The MIB-SL message may include a parameter nPSCCH. The parameter nPSCCH is used for identifying a radio resource (PSCCH resource) in which the control information is transmitted. The control information is information for instructing (designating) a radio resource (PSSCH resource) in which the SIB-SL (specifically, an SIB-SL (SA) described later) is transmitted.

The UE 100-1 may start transmission of the MIB-SL message (and the SLSS), based on a manipulation by the user. If a function of the relay UE is in an ON state, the UE 100-1 may transmit the MIB-SL message by the manipulation by the user. If the function of the relay UE is in an OFF state, the UE 100-1 may stop transmission of the MIB-SL message by the manipulation by the user.

The SLSS is a sidelink synchronization signal (SLSS: Sidelink Synchronization Signal) transmitted via the PSBCH. The SLSS is comprised of a primary sidelink synchronization signal (PSSS: Primary Sidelink Synchronization Signal) and a secondary sidelink synchronization signal (SSSS: Secondary Sidelink Synchronization Signal).

In step S102, the UE 100-2 having received the MIB-SL message starts monitoring the SIB-SL.

The UE 100-2 uses the MIB-SL message to identify the location of the radio resource in which the SIB-SL is arranged. The UE 100-2 may identify the location of the radio resource in which the SIB-SL is arranged, by information included in the MIB-SL message. The UE 100-2 may identify the location of the radio resource in which the SIB-SL is arranged, by the location (time location and/or frequency location) of the MIB-SL message.

The UE 100-2 may identify the location of the radio resource in which the SIB-SL is arranged, by using the parameter nPSCCH. Specifically, the UE 100-1 identifies the PSCCH resource used for transmitting the control information, by using the parameter nPSCCH. The UE 100-2 acquires the control information by monitoring the identified PSSCH resource. The UE 100-2 can identify the location of the radio resource in which the SIB-SL (SA) is arranged by using the acquired control information (see FIG. 8). The SIB-SL (SA) is information for identifying the location of the radio resource in which the SIB-SL (Data) is arranged.

The UE 100-2 monitors the location of the radio resource in which the identified SIB-SL is arranged.

In step S103, in the sidelink, the UE 100-1 transmits the SIB-SL (System Information Block SL message). For example, the UE 100-1 transmits the SIB-SL via an SBCCH (Sidelink Broadcast Control Channel).

The SIB-SL is configured by the SIB-SL (SA) and the SIB-SL (Data). The MIB-SL message is used for identifying the location of the radio resource in which at least the SIB-SL (SA) is arranged.

Figure 8:
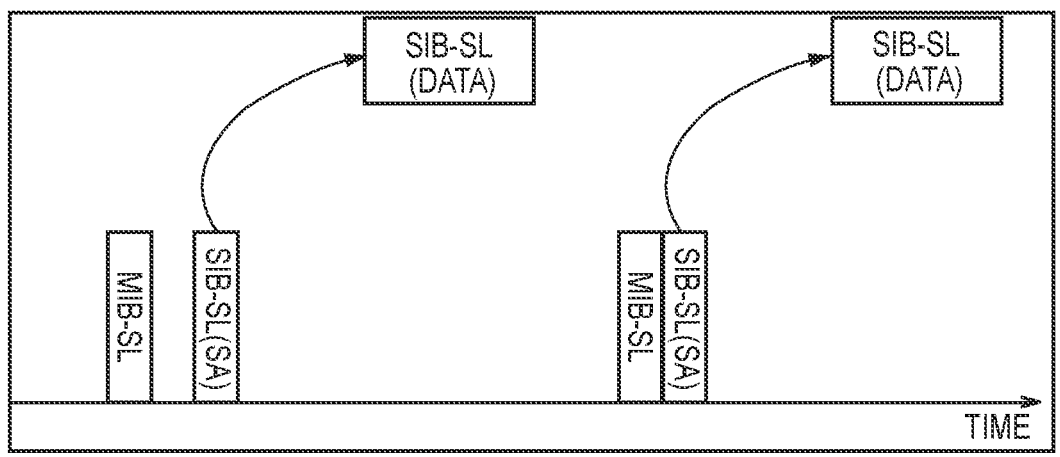
FIG. 8 is a (first) diagram for describing an operation according to an embodiment.

As illustrated in FIG. 8, the SIB-SL (SA) is used for identifying the location of the radio resource in which the SIB-SL (Data) is arranged. The SIB-SL (SA) may include information for identifying the location of the radio resource in which the SIB-SL (Data) is arranged (scheduling assignment: SA (Scheduling Assignment)). The SIB-SL (SA) may include information identifying the time location and/or the frequency location of the radio resource in which the SIB-SL (Data) is arranged.

With the location of the radio resource in which the SIB-SL (Data) is arranged, the location of the radio resource in which the SIB-SL (SA) is arranged may be specified. For example, the frequency location of the SIB-SL (SA) may correspond to the frequency location of the SIB-SL (Data). The SIB-SL (Data) may be located after a previously specified time period has elapsed from the time location of the MIB-SL message.

The SIB-SL (Data) includes a radio resource for requesting relay by the proximity-based service. The radio resource may be a (plurality of) resource pools. The radio resource is a radio resource used in a discovery in the sidelink (DiscTxNormalResource: resource pool for sidelink discovery) or a radio resource used for communication in the sidelink (CommTxNormalResource: resource pool for sidelink communication).

The radio resource includes a plurality of small resources different from one another. The small resources may be resources respectively different in time and frequency locations. The small resources are, for example, (a plurality of) resource blocks (RB) selected from among a plurality of resource pools. Each of the plurality of small resources may be associated with a respectively different temporary identifier (Temporary ID).

The SIB-SL may include power information indicating transmission power of a sidelink signal (for example, any one radio signal of the SLSS, the MIB-SL, and the SIB-SL) from the UE 100-1 that is the transmission source. The UE 100-2 may calculate a path loss, based on the power information and a reception level of the sidelink signal from the UE 100-1. The UE 100-2 may adjust the transmission power, based on the path loss. The UE 100-2 may use a reception level (a received strength (S-RSRP) and a reception quality (S-RSRQ)) of the reference signal in the RB (resource block) in which the PSBCH is transmitted. The UE 100-2 may use the reception level (the received strength (SD-RSRP) and the reception quality (SD-RSRQ)) of the reference signal in the RB in which the PSDCH is transmitted.

The UE 100-2 identifies the location of the radio resource in which the SIB-SL (Data) is arranged, by the SIB-SL (SA). By receiving the SIB-SL (Data), the UE 100-2 can recognize the radio resource for requesting the relay by the proximity-based service.

The UE 100-2 may select the radio resource (small resource) to be used from among the radio resources. The UE 100-2 may randomly select the small resource. The UE 100-2 may select the small resource, based on a parameter nPSDCH. The parameter nPSDCH is a parameter used by the UE 100-2 for uniquely selecting the radio resource within the resource pool.

The existing UE capable of performing the cellular communication can previously acquire, while existing in the cell, a configuration (Pre-config.) of the radio resource (resource pool) from the network (for example, the eNB 200 or the ProSe application server and the like). The configuration of the radio resource may be stored in the SIM mounted in the existing UE. Therefore, the existing UE can specify the radio resource (resource pool) to be used for requesting the relay, even in a case of the MIB-SL message with a limited capacity. If the existing SIM is not mounted, the UE 100-2 not capable of performing the cellular communication cannot previously hold the configuration of the radio resource. Thus, even if the radio resources are specified by the MIB-SL message, the UE 100-2 cannot recognize the radio resource (resource pool) to be used.

On the other hand, the MIB-SL message is transmitted together with the SLSS, and thus, basically, a non-synchronized UE is to receive the MIB-SL message. Thus, by extending the capacity of the MIB-SL message, there is a possibility that the non-synchronized UE cannot receive all of the MIB-SL messages of large capacity, even if information indicating the radio resource (resource pool) to be used for requesting the relay is included in the MIB-SL message. Therefore, until receiving the next MIB-SL message, the UE 100-2 may not be capable of requesting the relay. There is a possibility that interference occurs by the extension of the MIBSL message.

However, in the sequence described above, the UE 100-2 can identify the location of the radio resource in which the SIB-SL is arranged, by the MIB-SL message. If identifying the location of the radio resource in which the SIB-SL is arranged by the location of the MIB-SL message, there is no particular problem, even if the capacity of the MIB-SL message is limited. Also in a case where the location of the radio resource in which the SIB-SL is arranged is identified by the information included in the MIB-SL message, an amount of information for identifying the location of the radio resource in which the SIB-SL is arranged is smaller than an amount of information of the radio resource (the resource pool) itself, and thus, an existing MIB-SL message can include the information for identifying the location of the radio resource in which the SIB-SL is arranged. Therefore, the UE 100-2 can recognize, by the existing MIB-SL message, the radio resource for requesting the relay by the proximity-based service.

After being synchronized with the UE 100-1 of the transmission source by the SLSS, the UE 100-2 can receive the SIB-SL, and thus, the UE 100-2 can receive more surely all of the SIB-SLs even if the amount of information of the SIB-SL is large.

In step S104, the UE 100-2 requests, to the UE 100-1, the relay by the proximity-based service. The UE 100-2 uses the radio resource (small resource) included in the SIB-SL (Data) to request the relay to the UE 100-1 in the sidelink. Specifically, the UE 100-2 transmits a message for requesting the relay (relay request: first message) to the UE 100-1. For example, the UE 100-2 may use the radio resources of two RBs to transmit the discovery message as the relay request.

For example, the UE 100-2 may use the radio resource for the discovery (DiscTxNormalResource) to request, to the UE 100-1, the relay by the discovery message (Discovery announcements).

The relay request may include a temporary identifier associated with a plurality of small resources. That is, the UE 100-2 may include the temporary identifier, into the relay request.

The UE 100-2 may randomly select a content of the message for the relay request, from a predetermined range. For example, if using the discovery message, the UE 100-2 randomly selects the content of the message from a plurality of pattern values (for example, a value of "2232"). The UE 100-2 transmits the discovery message including the selected pattern value, as the relay request, to the UE 100-1. The contents of the messages may be signal sequences different from one another. The signal sequence is a signal sequence used when requesting the relay by the proximity-based service (preamble sequence). As a result, even if a plurality of remote UEs request the relay by using the same radio resource, the relay UE (UE 100-1) can comprehend the plurality of relay requests.

The UE 100-1 may indirectly comprehend the parameter nPSDCH used by the UE 100-2, from the location of the resource (the location where the resource is arranged). For example, the UE 100-1 monitors the resource in the resource pool for the relay request. The UE 100-1 can comprehend the parameter nPSDCH used by the UE 100-2, from a location (location where the resource is arranged) of a resource in which the signal can be received (that is, a CRC (Cyclic Redundancy Check)).

The UE 100-1 uses the radio resource (small resource) included in the SIB-SL (Data) to receive the transmitted relay request from the UE 100-2. The UE 100-1 stores a content included in the relay request. For example, the UE 100-1 stores the parameter nPSDCH and the temporary identifier.

The UE 100-1 may store a propagation delay (delay time) between the UE 100-1 and the UE 100-2. For example, the UE 100-1 can estimate the propagation delay (the delay time) by the method below.

Firstly, the UE 100-2 is synchronized with the synchronization signal (SLSS) from UE 100-1. Here, due to a distance between the UE 100-1 and the UE 100-2, a synchronization shift (delay time $\tau$) occurs between the UE 100-1 and the UE 100-2. The UE 100-2 not having the cellular communication function does not have a timing reference, and thus, the UE 100-2 cannot recognize the synchronization shift. Therefore, the UE 100-2 transmits the relay request after the delay time τ from the reference of the UE 100-1. Further, the UE 100-1 receives the relay request after the delay time τ due to the distance between the UE 100-1 and the UE 100-2. Therefore, a difference between the timing when the UE 100-1 receives the relay request and the reference timing of the UE 100-1 (propagation delay) is 2τ. The UE 100-1 can estimate a value of the propagation delay τ by using an equation "(signal reception timing from the remote UE)−(reference timing of the relay UE)=2τ".

The UE 100-1 may identify the small resource by the parameter nPSDCH and/or the temporary identifier.

In step S105, the UE 100-2 starts monitoring a response from the UE 100-1. The UE 100-2 may start monitoring the response, triggered by the relay request being transmitted.

The SIB-SL (Data) may include a radio resource for receiving the response from the UE 100-1. The UE 100-2 may monitor the response in a range of the radio resource.

The UE 100-2 may monitor the response in a range of another radio resource corresponding to the radio resource (small resource) used for transmitting the relay request. For example, the UE 100-2 may monitor the response in the frequency band of the small resource used for the transmission. For example, the UE 100-2 may monitor one or more small resources, from within the resource pool, calculated by using the parameter nPSDCH (small resource selection parameter) used for transmitting the relay request.

If the UE 100-2 cannot receive the response after a predetermined time has elapsed, the UE 100-2 may execute the process of step S104. The UE 100-2 may include a timer for measuring the predetermined time. The UE 100-2 may start the timer according to the transmission of the relay request. If the timer expires before receiving the response, the UE 100-2 may execute the process of step S104. A value of the timer may be included in the SIB-SL.

If executing the process of step S104 again, the UE 100-2 may transmit a new relay request at a transmission power higher than the transmission power of the previously transmitted relay request. In this case, the UE 100-2 may transmit the new relay request at a transmission power within a range not exceeding a maximum transmission power. Information indicating the maximum transmission power may be included in the SIB-SL.

In step S106, in response to the reception of the relay request, the UE 100-1 transmits information indicating a desire for the relay (D2D relay request) to the eNB 200. For example, the UE 100-1 transmits information indicating an intention for the relay, to eNB 200. For example, the UE 100-1 may transmit information indicating a request for a resource for performing the relay, to the eNB 200. The UE 100-1 may transmit an SL-UE information (SL-UEInformation) message indicating the desire for the relay, to the eNB 200.

The UE 100-1 need not transmit the information indicating the desire for the relay, to the eNB 200. The UE 100-1 may execute the process of step S110, without executing the process of step S106. For example, if the radio resource for the relay is previously allocated from the eNB 200, the UE 100-1 may omit the process of step S106.

In step S107, the eNB 200 transmits information indicating that the UE 100-1 desires the relay (D2D relay request), to the network (NW). The NW may be, for example, an upper node of the eNB 200 (for example, the MME 300). The NW may be a Server 600 (for example, the ProSe application server). The NW may be a ProSe function (ProSe Function).

The eNB 200 may execute the process of step S109, without executing the process of step S107.

In step S108, the NW transmits a response to the eNB 200. Specifically, the NW transmits, to the eNB 200, information indicating that a preparation for the relay is completed (D2D relay complete). The NW may transmit, to the eNB 200, information indicating whether or not to allow the relay. The NW may transmit, to the eNB 200, an acknowledgement of the UE (relay UE (UE 100-1)) allowing the relay and/or information indicating the remote UE (acknowledgement of (the UE 100-2)). The NW may transmit, to the eNB 200, a non-acknowledgement of the UE (relay UE (UE 100-1)) not allowing the relay and/or information indicating the remote UE (non-acknowledgement of (the UE 100-2)).

In step S109, the eNB 200 allocates a radio resource (D2DDedicatedResource) individually to the UE 100-1. For example, the eNB 200 may allocate the radio resource by an RRC connection reconfiguration (RRCConnectionReconfig.) message. The radio resource is the radio resource used in step S113. The radio resource may include the radio resources used in steps S110 to S112.

The eNB 200 may allocate a semi-static radio resource. Details of the allocation of the semi-static radio resource (Semi-Static Resource allocation) will be described later.

In step S110, the UE 100-1 transmits, to the UE 100-2, a response (second message) to the relay request. The UE 100-1 may use the radio resource for discovery (DiscTxNormalResource) included in the SIB-SL to transmit the response by the discovery message (Discovery announcements) to the UE 100-2.

A response message may include a temporary identifier (Temporary ID) included in the relay request. The response message may also include another information included in the relay request. Thus, even if the UE 100-1 transmits the response message to each of a plurality of relay requests received from a plurality of remote UEs, the remote UE can comprehend whether or not the response message is addressed to the remote UE.

The response message may include information of a temporary radio resource used in step S111. The response message may include information of a temporary radio resource used in step S112.

The UE 100-1 may generate timing information, based on the propagation delay between the UE 100-1 and the UE 100-2 (for example, the propagation delay calculated in step S104).

Based on the propagation delay between the UE 100-1 the UE 100-2, the UE 100-1 may adjust a transmission and/or reception timing of the sidelink, as described below. The UE 100-1 may include the timing information into the response message if the transmission and/or reception timing in the UE 100-2 is adjusted. The timing information is transmission timing information for adjusting the transmission timing from the UE 100-2 to the UE 100-1 and/or transmission timing information for adjusting the reception timing from the UE 100-1 to the UE 100-2.

Figure 9:
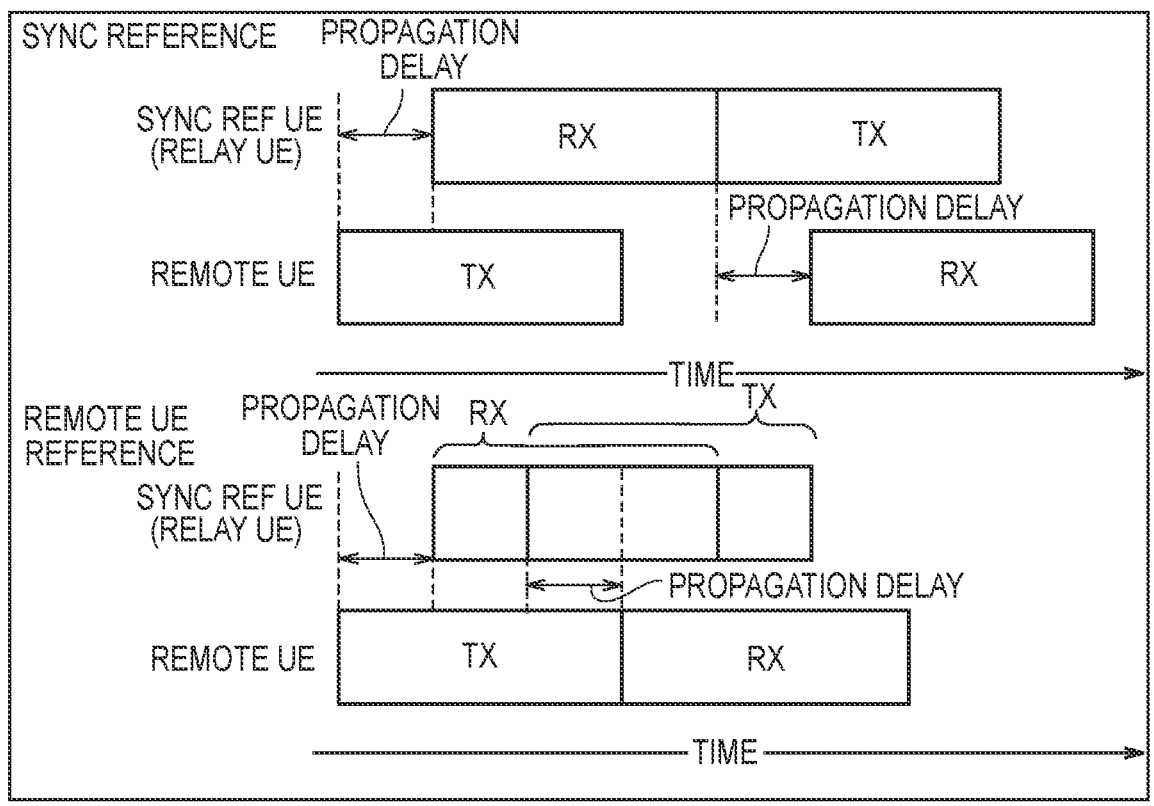
FIG. 9 is a (second) diagram for describing the operation according to the embodiment.

As illustrated in FIG. 9 (upper part), the UE 100-1 may, for example, adjust a communication timing, based on the UE 100-1 (Sync Ref UE (Relay UE)) or synchronization source (the relay UE). In this case, the UE 100-2 (remote UE) performs, in consideration of the propagation delay, a control for transmitting the sidelink signal (for example, the signals in steps S111 and S113) ahead of a scheduled transmission timing. The UE 100-2 performs, in consideration of the propagation delay, a control for receiving the sidelink signal (for example, the signals in steps S112 and S113) behind than a scheduled reception timing.

As illustrated in FIG. 9 (lower part), the UE 100-1 may use the UE 100-2 (the remote UE) as a reference. In this case, the UE 100-1 performs, in consideration of the propagation delay, a control for transmitting the sidelink signal (for example, the signals in steps S110, S112, and S113, and the like) ahead of the scheduled transmission timing. The UE 100-2 performs, in consideration of the propagation delay, a control for receiving the sidelink signal (for example, the signals in steps S111 and S113) behind the scheduled reception timing. A final symbol of the transmission resource of the UE 100-2 may be set to blank.

For example, if the transmitter and the receiver included in the UE 100-1 are operable independently, the UE 100-1 may use the UE 100-2 (the remote UE) as the reference. In this case, the final symbol of the transmission resource of the UE 100-2 need not be set to blank. If including only one transceiver, the UE 100-1 may use the UE 100-1 (the relay UE) as the reference.

In step S111, the UE 100-2 transmits, to the UE 100-1, a response (third message) to the message of step S110. The UE 100-2 may use information of the temporary radio resource included in the second message (response message in step S110) to transmit the third message. The UE 100-2 may transmit the third message by sidelink communication. The third message may include a unique identifier of the UE 100-2.

In step S112, the UE 100-1 transmits, to the UE 100-2, a response (fourth message) to the message of step S111. The UE 100-1 may use the information of the temporary radio resource included in the second message (response message in step S110) to transmit the fourth message. The UE 100-1 may transmit the fourth message by sidelink communication. The fourth message may include the unique identifier of the UE 100-2.

Thus, a connection in the sidelink may be established between the UE 100-1 and the UE 100-2.

In step S113, the UE 100-1 and the UE 100-2 start the sidelink communication. Specifically, the UE 100-1 starts the relay by the proximity-based service.

In the sidelink communication, the following operations may be performed.

The UE 100-1 and the UE 100-2 use the dedicated resource individually allocated to the UE 100-1 to perform the sidelink communication. The UE 100-1 and the UE 100-2 share the dedicated resource. The dedicated resource may be the semi-static radio resource.

The UE 100-1 and the UE 100-2 use only the dedicated resource to perform the sidelink communication. Thus, the UE 100-1 and the UE 100-2 do not need to monitor another radio resource (for example, all the resource pools). Therefore, a power consumption can be reduced.

The UE 100-1 may request the semi-static radio resource (dedicated resource) from the eNB 200 (S106). If receiving the request, the eNB 200 may allocate the semi-static radio resource (S109). The eNB 200 may allocate the semi-static radio resource to the UE 100 by the RRC connection reconfiguration message. The dedicated resource is shared between the UE 100-1 the UE 100-2, and thus, the eNB 200 need not consider the UE 100-2 (the remote UE).

The UE 100-1 and the UE 100-2 share the dedicated resource. The reception consumes less power than the transmission, and thus, the dedicated resource may be divided so that the UE 100-1 has more resource than the UE 100-2. For example, a ratio of the transmission resource (reception resource) of the UE 100-1, relative to the transmission resource (reception resource) of the UE 100-2 may be X to 1. X is a value greater than 1.

The UE 100-1 and the UE 100-2 may share the distribution of the dedicated resource by using TDD configuration information, so that there is not contention between the resource allocation of the UE 100-1 and the resource allocation if the UE 100-2. The TDD configuration information may be included in the MIB-SL message from the UE 100-1. The TDD configuration information may include allocation information of the transmission resource of the UE 100-1 (of the reception resource of the UE 100-2) and allocation information of the transmission resource of the UE 100-2 (of the reception resource of the UE 100-1).

Figure 10:
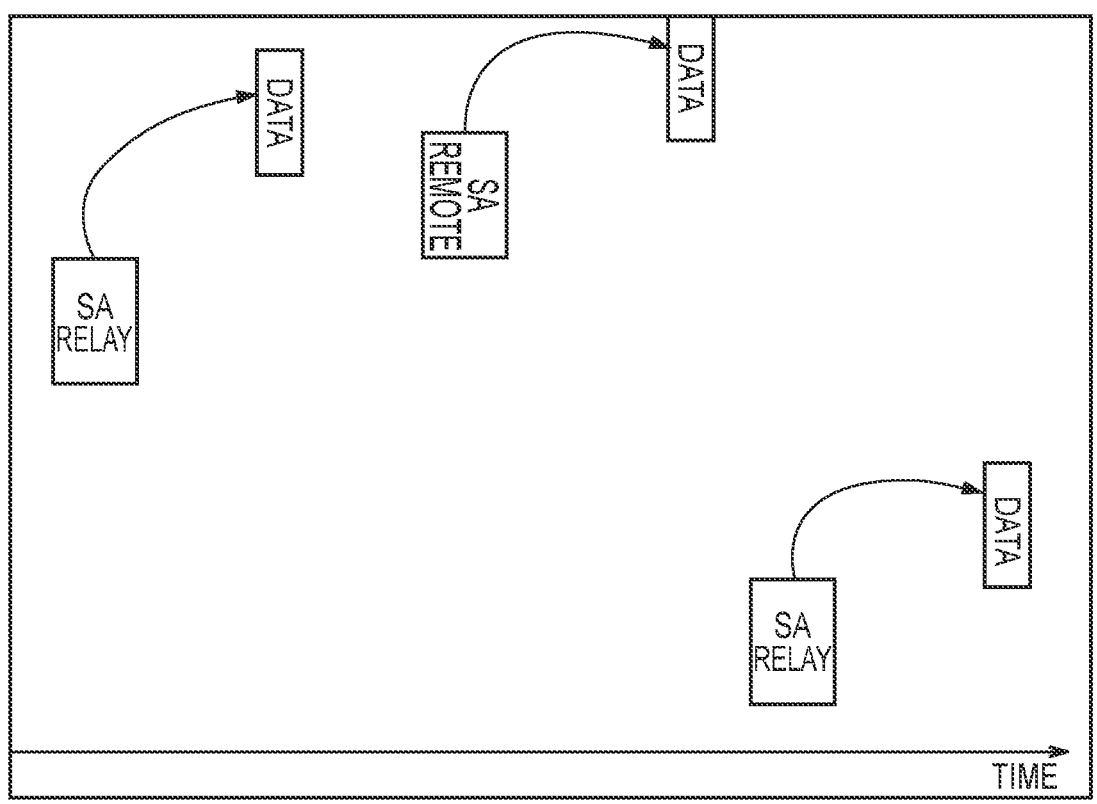
FIG. 10 is a (third) diagram for describing the operation according to the embodiment.

For example, as illustrated in FIG. 10, the UE 100-1 transmits control information (SA Relay) for specifying a monitor (reception) region (reception resource) of the UE 100-2. The monitor region corresponds to a radio resource included in the dedicated resource. The UE 100-1 transmits user data to the UE 100-2 in the specified monitor region (Data). The UE 100-2 monitors only the specified monitor region. Similarly, the UE 100-2 transmits the control information in a transmission region (SA Remote). The control information is information specifying the monitor region of the UE 100-1. The UE 100-2 transmits user data to the UE 100-1 in the specified monitor region (Data). The UE 100-1 monitors only the specified monitor region.

The UE 100-1 may transmit the control information (SA Relay) for specifying the monitor (reception) region (reception resource) of the UE 100-2 and the transmission region (transmission resource) of the UE 100-2. The monitor region and the transmission region correspond to radio resources included in the dedicated resource. The UE 100-1 transmits user data to the UE 100-2 in the specified monitor region (Data). The UE 100-2 monitors only the specified monitor region. The UE 100-2 transmits the control information in the specified transmission region (SA Remote). The control information is information for specifying the monitor region of the UE 100-1 and the transmission region of the UE 100-1. The UE 100-2 transmits user data to the UE 100-1 in the specified monitor region (Data). The UE 100-1 monitors only the specified monitor region. Similarly, the UE 100-1 transmits the control information in the specified transmission region (SA Relay). The control information is information for specifying the monitor region of the UE 100-2 (and the transmission region of the UE 100-1). The UE 100-2 monitors only the specified monitor region.

Figure 11:
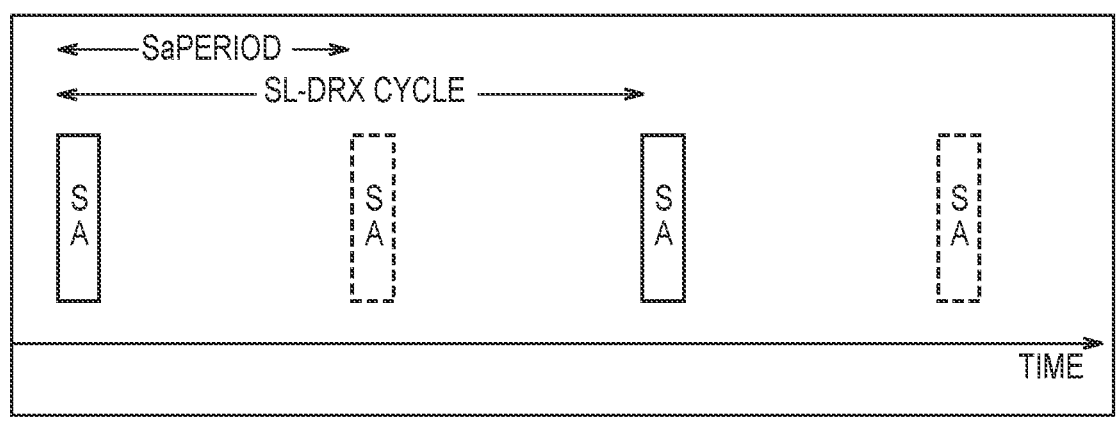
FIG. 11 is a (fourth) diagram for describing the operation according to the embodiment.

As illustrated in FIG. 11, if a plurality of control regions (SAs) used for transmitting the control information are arranged in a time direction, the following operation may be executed. The control information is used for identifying a location of a radio resource in which the user data is arranged.

The UE 100-2 executes a sidelink DRX (SL-DRX: Sidelink-Discontinuous Reception) operation. The SL-DRX operation is an operation for discontinuously monitoring a plurality of control regions. Specifically, the UE 100-2 monitors the control regions in accordance with a predetermined cycle (SL-DRX cycle). For example, if monitoring one control region, the UE 100-2 omits monitoring of the control region until the SL-DRX cycle has elapsed. The SL-DRX cycle is a length in units of a period (SA Piriod) of the control region. For example, as illustrated in FIG. 11, if the SL-DRX cycle is twice the period of the control region, the UE 100-2 omits a second (and a fourth) monitoring of the control region. Thus, the UE 100-2 can reduce the region to be monitored, and thus, power consumption can be reduced.

If the UE 100-2 executes the SL-DRX operation, the UE 100-1 may select, according to the SLDRX operation (SL-DRX cycle), a control region to be used for transmitting the control information from among the plurality of control regions. In an example of FIG. 11, the UE 100-1 can select a first (and a third) control region as the control region to be used for transmitting the control information.

The UE 100-1 acquires configuration information of the SL-DRX operation (for example, the SLDRX cycle) from the UE 100-2. Alternatively, the UE 100-1 may transmit the configuration information of the SL-DRX operation to the UE 100-2. The UE 100-1 may receive the configuration information of the SL-DRX operation from the eNB 200.

The configuration information of the SL-DRX operation may be different depending on each UE. The configuration information of the SL-DRX operation may be common to each UE.

As illustrated in FIGS. 12 and 13, the UE 100-1 may transmit power control information to the UE 100-2, in the sidelink communication. FIG. 12 is an example of power control by an open-loop TPC (Transmission Power Control). FIG. 13 is an example of power control by a closed-loop TPC.

In FIG. 12, the UE 100-1 transmits, to the UE 100-2, the power control information including parameter information (TPC parameter) for controlling the transmission power from the UE 100-2 to the UE 100-1. The UE 100-1 may transmit the power control information by the MIB-SL and/or the SIB-SL.

The parameter information is decided according to received power of the sidelink signal from the UE 100-1 to the UE 100-2. For example, the UE 100-2 may measure the received power (the received strength (S-RSRP) and/or the reception quality (S-RSRQ)) of the reference signal in an RB (resource block) in which the PSBCH is transmitted. In this case, the UE 100-2 can measure the received power of the SLSS from the UE 100-1. The UE 100-1 may periodically transmit the SLSS. The UE 100-2 may measure the received power (the received strength (SD-RSRP) and/or the reception quality (SD-RSRQ)) of the reference signal in the RB in which the PSDCH is transmitted. In this case, the UE 100-2 can measure the received power of the discovery message from the UE 100-1. The UE 100-1 may periodically transmit the discovery message.

The parameter information may include a path loss compensation factor α. The parameter information may include a desired received power Po. For example, the UE 100-2 calculates the transmission power by the following equation.

$$TxPower = \min(Pmax, Po + \alpha * PL)$$

TxPower denotes the transmission power. PL denotes a path loss between the UEs (between the remote UE–the relay UE).

Based on a measurement result and the parameter information, the UE 100-2 decides the received power of the sidelink signal to the UE 100-1.

In FIG. 13, the UE 100-2 transmits the sidelink signal to the UE 100-1. The UE 100-1 measures the received power of the sidelink signal (at least any one of S-RSRP, S-RSRQ, SD-RSRP, and SD-RSRQ).

The UE 100-1 transmits, to the UE 100-2, the power control information including command information (TPC command) for controlling the transmission power from the UE 100-2 to the UE 100-1. The UE 100-1 may transmit the power control information (command information) to the UE 100-2 by control information (SCI: Sidelink Control Information) transmitted by the PSCCH. The UE 100-1 may transmit the power control information (command information) to the UE 100-2 by the discovery message. The UE 100-1 may transmit the power control information (command information) to the UE 100-2 by a packet (data) transmitted by the PSSCH. The UE 100 may include the command information, into an MAC header of the packet.

The command information may be any one of an instruction to increase the transmission power, an instruction to decrease the transmission power, and an instruction to maintain the transmission power. The instruction to (greatly) increase the transmission power may be an increasing transmission power value (variable value). The instruction to (greatly) decrease the transmission power may be a decreasing transmission power value (variable value). The command information may be any one of an instruction to transmit at the maximum transmission power of the UE 100-2, an instruction to transmit at the minimum transmission power of the UE 100-2, an instruction to use the S-RSRP as a reference, and an instruction to use the SD-RSRP as a reference. If the S-RSRP is used as the reference, the transmission power is calculated based on the S-RSRP. For example, the path loss (PL) used to calculate the transmission power described above is calculated by the S-RSRP. Similarly, if the SD-RSRP is used as the reference, the transmission power is calculated based on the SD-RSRP. For example, the path loss (PL) used to calculate the transmission power described above is calculated by the SD-RSRP. The command information may be an instruction to adapt to the RSRP indicating the received power strength of the reference signal from the eNB 200. The UE 100-1 may transmit the RSRP measured by the UE 100-1 to the UE 100-2.

Thus, the UE 100-2 can adjust the transmission power of the sidelink signal, according to the received power of the sidelink signal between the UE 100-1 and the UE 100-2. Generally, the distance between UE-UE is shorter than the distance between eNB-UE, and thus, it is possible to properly adjust the transmission power, as compared to a case where the transmission power of the sidelink signal is adjusted by the received power (RSRP) of a downlink signal between the eNB 200 and the UE 100-2. As a result, a power consumption can be reduced. It is possible to suppress an interference inflicted on the eNB 200 and another UE 100.

(First Modification)

A first modification according to the embodiment will be described by using FIG. 14. FIG. 14 is a sequence chart for describing the first modification. In the first modification, the UE 100-2 transmits the relay request, without using the radio resource included in the SIB-SL (Data).

In FIG. 14, the UE 100-2 previously stores the radio resource for requesting the relay by the proximity-based service. Information of the radio resource may be a fixed value stored at the time of manufacture of the UE 100-2 (memory). For example, the radio resource may be stored in a SIM not having the cellular communication function (D2D SIM).

Step S201 corresponds to step S101. In response to the receipt of the SLSS and/or the MIB-SL, the UE 100-2 may start the process of step S202.

Step S202 corresponds to step S104. Here, the UE 100-2 uses the previously stored radio resource to request, to the UE 100-1, the relay by the proximity-based service.

Steps S203 to S211 correspond to steps S105 to S113.

(Second Modification)

Figure 15:
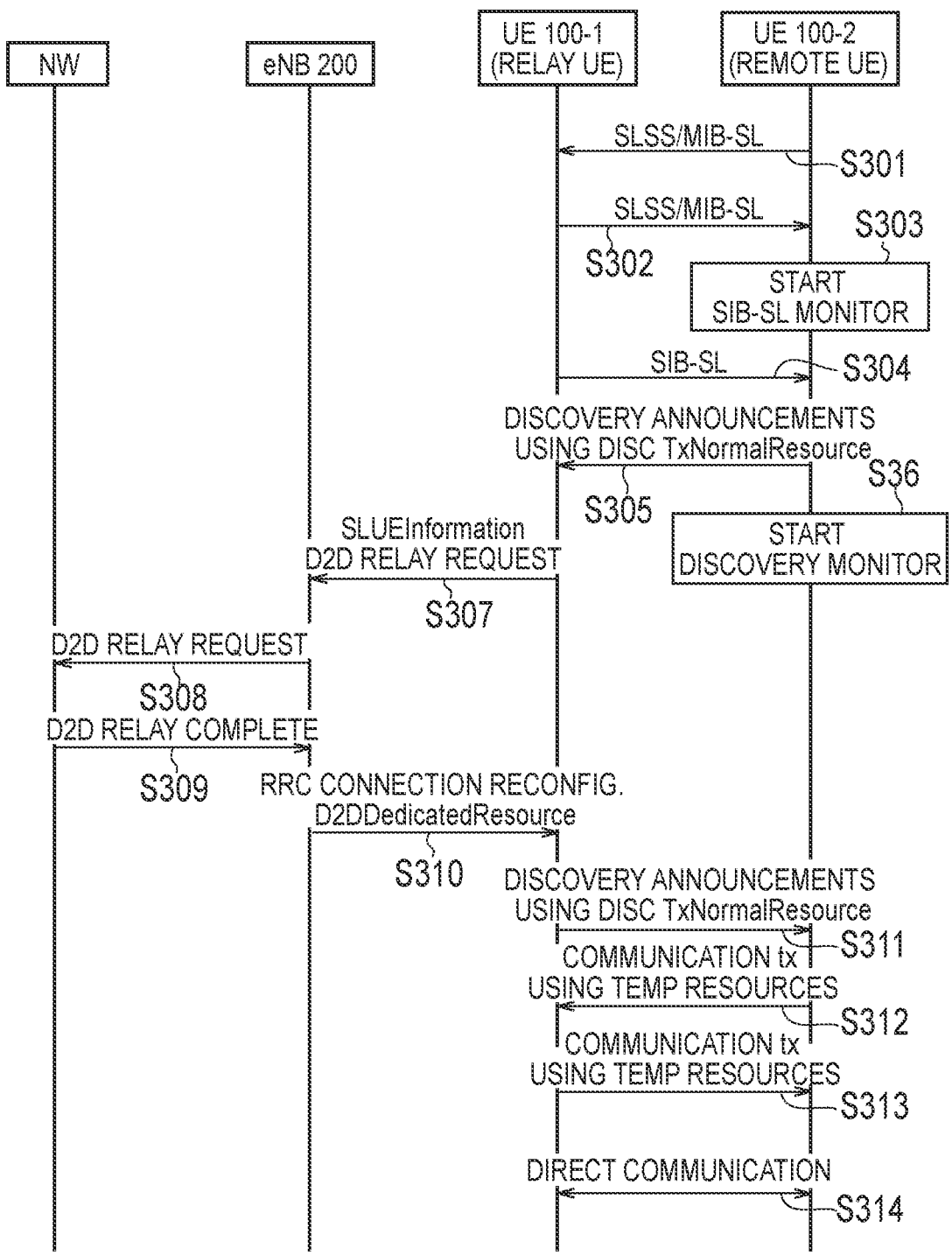
FIG. 15 is a sequence chart for describing a second modification.

A second modification according to the embodiment will be described by using FIG. 15. FIG. 15 is a sequence chart for describing the second modification. In the second modification, the UE 100-1 starts transmission of the SLSS/MIB-SL, in response to receipt of the sidelink signal from the UE 100-2.

As illustrated in FIG. 15, in step S301, the UE 100-2 transmits the SLSS and/or the MIB-SL, in the sidelink.

The radio resource used only for transmitting the SLSS and/or the MIB-SL is previously stored in the UE 100-2. The information of the radio resource may be a fixed value stored at the time of manufacture of the UE 100-2 (memory). For example, the radio resource may be stored in the SIM not having the cellular communication function (D2D SIM).

The UE 100-2 may include an identifier (SLSS ID) indicating that the UE 100-2 is the remote UE, into the SLSS. The UE 100-1 may include information indicating that the UE 100-1 is the remote UE, into the MIB-SL.

If receiving the SLSS and/or the MIB-SL from the UE 100-2, the UE 100-1 starts the process of step S302. If receiving the SLSS and/or the MIB-SL from the UE 100-1, the UE 100-2 stops transmission of the SLSS and/or the MIB-SL. Thus, the transmission of the SLSS and/or the MIB-SL is taken over to the UE 100-1 from the UE 100-2.

Step S302 corresponds to step S101. The UE 100-1 transmits the SLSS and/or the MIB-SL at a timing different from the timing indicated by an offset indicator included in the received SLSS and/or the MIB-SL.

The UE 100-1 may include an identifier (SLSS ID) indicating that the UE 100-1 is the relay UE, into the SLSS. The UE 100-1 may include information indicating that the UE 100-1 is the relay UE, into the MIB-SL.

Steps S303 to S314 correspond to steps S102 to S113.

(Third Modification)

Figure 16:
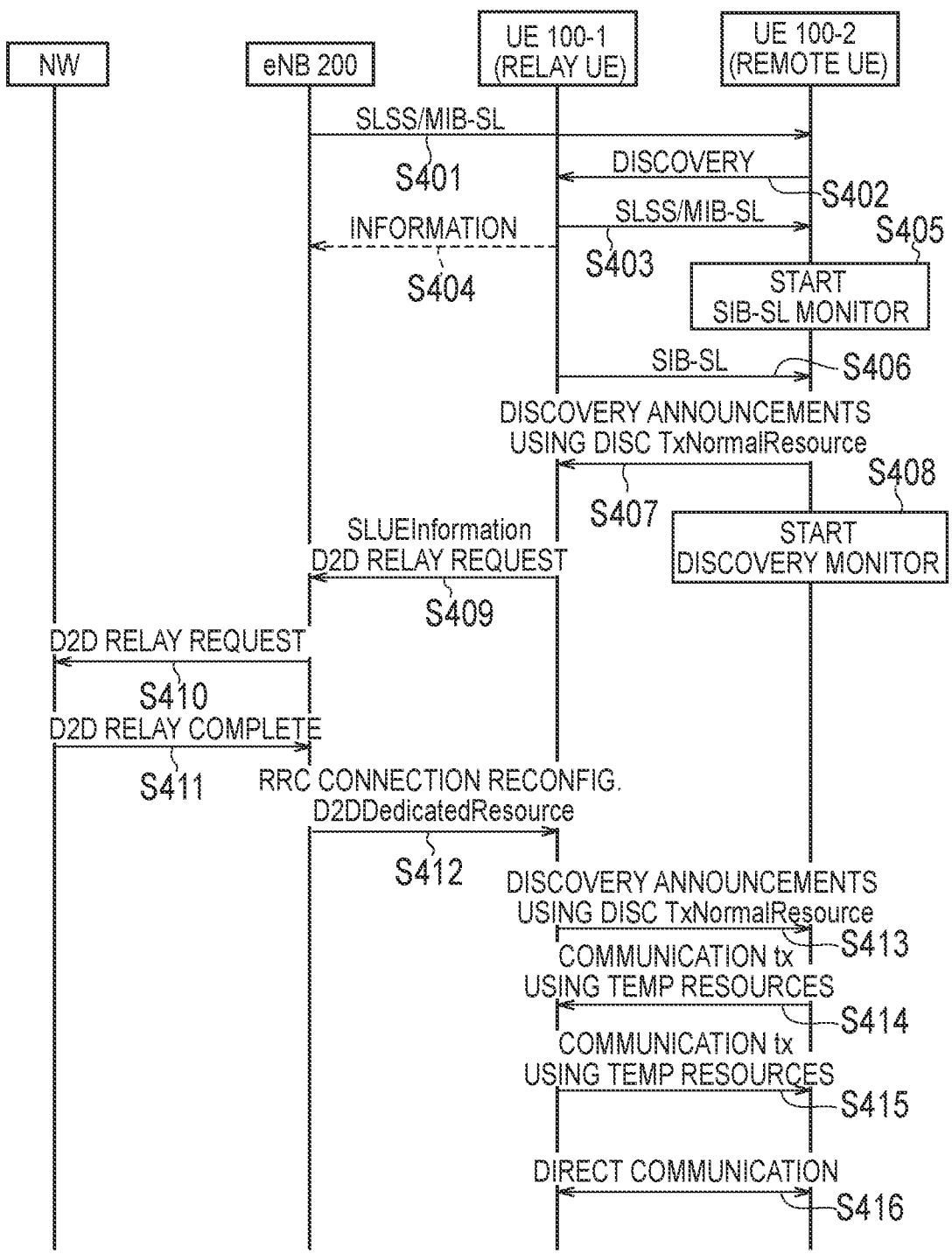
FIG. 16 is a sequence chart for describing a third modification.

A third modification according to the embodiment will be described by using FIG. 16. FIG. 16 is a sequence chart for describing the third modification. In the third modification, the eNB 200 transmits the SLSS/MIB-SL.

As illustrated in FIG. 16, in step S401, the eNB 200 (periodically) transmits the SLSS and/or the MIB-SL, in the sidelink. The eNB 200 may (periodically) transmit the SIB-SL, in the sidelink.

Information of the radio resource for an initial access may be included in at least any one of the SLSS, the MIB-SL, and the SIB-SL.

The eNB 200 has a sidelink transmission and reception function. In this case, the eNB 200 may transmit, as the cell, the sidelink signal (the SLSS and/or the MIB-SL), in the sidelink. In this case, the UE having received the sidelink signal recognizes the transmission source of the sidelink signal as the cell (the eNB 200). As the UE, the eNB 200 may transmit the sidelink signal, in the sidelink. In this case, the UE having received the sidelink signal recognizes, as the UE, the transmission source of the sidelink signal.

In step S402, the UE 100-2 uses the information of the radio resource received from the eNB 200 to transmit the sidelink signal (for example, the discovery message). The sidelink signal may include information indicating a request for the relay.

If receiving the SLSS and/or the MIB-SL from the UE 100-2, the UE 100-1 starts the process of step S403.

The UE 100-1 may transmit, to the eNB 200, information indicating a transmission start of the SLSS and/or the MIB-SL, in the uplink or the sidelink (step S404). If receiving the information from the UE 100-1, the eNB 200 may stop the transmission of the SLSS and/or the MIB-SL. Thus, the transmission of the SLSS and/or the MIB-SL is taken over to the UE 100-1 from the eNB 200. The UE 100-1 need not transmit the information of step S404 to the eNB 200.

Steps S403 and steps S405 to S416 correspond to steps S101 to S113.

Other Embodiments

The contents of the present application are described according to each of the above-described embodiments, but it should not be understood that the discussion and the drawings constituting a part of this disclosure limit the contents of the present application. From this disclosure, various alternative embodiments, examples, and operational technologies will become apparent to those skilled in the art.

In the embodiments described above, in the sidelink communication for the relay in the proximity-based service, a power-saving operation (sharing of the dedicated resource, the SL-DRX operation, and the transmission power control) for reducing the power consumption is executed, but this is not an exclusive example. In normal sidelink communication, the power-saving operation may be executed. In the sidelink discovery, the power-saving operation may be executed.

The UE 100-1 or relay UE may execute the SL-DRX operation. The UE 100-2 of remote UE may transmit the power control information to the UE 100-1.

The operation according to each of the above-described embodiments may be combined to be executed, where necessary. In each of the above-described sequences, all of the operations may not necessarily be an essential configuration. For example, in each sequence, only some of the operations may be executed.

Although not particularly mentioned in each of the above-described embodiments, a program for causing a computer to execute each process performed by any one of the above-described nodes (such as the UE 100 and the eNB 200) may be provided. The program may be recorded on a computer-readable medium. If the computer-readable medium is used, it is possible to install the program on a computer. Here, the computer-readable medium recording therein the program may be a non-transitory recording medium. The non-transitory recording medium may include, but not be limited to, a recording medium such as a CD-ROM and a DVD-ROM, for example.

Alternatively, a chip may be provided which includes: a memory for storing a program for performing each process performed by any one of the UE 100 and the eNB 200; and a processor) for executing the program stored in the memory.

In the above-described embodiments, an LTE system is described as an example of the mobile communication system; however, the LTE system is not an exclusive example, and the content according to the present application may be applied to a system other than the LTE system.

The entire content of Japanese Patent Application No. 2016-022242 (filed on Feb. 8, 2016) is incorporated in the present specification by reference.

The invention claimed is:

1. A radio terminal, comprising:
a controller configured to be capable of relaying traffic between another radio terminal and a network by a proximity service, wherein
the controller performs a control for transmitting first information and second information, in a sidelink,
the first information is used for identifying a location of a radio resource in which the second information is arranged, and
the second information is used to identify a location of a radio resource for requesting the relay by the proximity service.

2. The radio terminal according to claim 1, wherein
the controller executes a control for receiving, from the another radio terminal, a request for the relay transmitted by using the radio resource.

3. The radio terminal according to claim 2, wherein
the controller performs a control for transmitting, to a base station, information indicating a desire for the relay, in response to reception of the request for the relay.

4. The radio terminal according to claim 2, wherein
the radio resource includes a plurality of respectively different small resources,
each of the plurality of small resources is associated with a respectively different temporary identifier,
the request for the relay includes a temporary identifier associated with a small resource used for transmitting the request for the relay,
the controller executes a control for transmitting a response to the request for the relay to the another radio terminal, and
the response includes the temporary identifier included in the request for the relay.

5. The radio terminal according to claim 2, wherein
the controller executes a control for transmitting a response to the request for the relay to the another radio terminal, and
the response includes information for adjusting a transmission timing to the radio terminal from the another radio terminal.

6. The radio terminal according to claim 1, wherein
the controller executes, before transmitting the first information, a control for receiving third information in the sidelink from the another radio terminal or a base station, and
the controller starts, in response to receipt of the third information, a control for transmitting the first information.

7. The radio terminal according to claim 1, wherein
the controller is individually allocated, from a base station, with a dedicated resource used in the sidelink, and
the controller shares the dedicated resource with the another radio terminal.

8. The radio terminal according to claim 1, wherein
a plurality of control regions used for transmitting control information are arranged in a time direction,
the control information is used for identifying a location of a radio resource in which user data transmitted in a sidelink is arranged,
the controller selects a control region used for transmitting the control information out of the plurality of control regions, according to a sidelink DRX (Discontinuous Reception) operation of the another radio terminal, and
the sidelink DRX operation is an operation for discontinuously monitoring, by the another radio terminal, the plurality of control regions.

9. The radio terminal according to claim 1, wherein
the controller executes a control for transmitting power control information to the another radio terminal,
the power control information includes parameter information for controlling a transmission power of a sidelink signal to the radio terminal from the another radio terminal, and
the parameter information is decided according to a received power of the sidelink signal from the radio terminal to the another radio terminal.

10. The radio terminal according to claim 1, wherein
the controller executes a control for transmitting power control information to the another radio terminal,
the power control information includes command information for controlling a transmission power of a sidelink signal to the radio terminal from the another radio terminal, and
the command information is decided according to a received power of the sidelink signal.

11. A radio terminal, comprising:
a controller configured to execute a control for receiving first information and second information, in a sidelink, from another radio terminal configured to be capable of relaying traffic between the radio terminal and a network by a proximity service, wherein
the first information is used to identify a location of a radio resource in which the second information is arranged, and
the second information is used to identify a location of a radio resource for requesting the relay by the proximity service.

12. The radio terminal according to claim 11, wherein
the controller executes a control for transmitting a request for the relay, to the another radio terminal, by using the radio resource.

13. The radio terminal according to claim 12, wherein
the radio resource includes a plurality of respectively different small resources,
each of the plurality of small resources is associated with a respectively different temporary identifier, and
the controller includes a temporary identifier associated with a small resource used for transmitting a request for the relay, into the request for the relay.

14. The radio terminal according to claim 13, wherein
the controller executes a control for receiving a response to the request for the relay from the another radio terminal, and
the response includes the temporary identifier included in the request for the relay.

15. The radio terminal according to claim 12, wherein
the controller executes a control for receiving a response to the request for the relay from the another radio terminal, and
the response includes information for adjusting a transmission timing to the another radio terminal from the radio terminal.

16. The radio terminal according to claim 11, wherein
the controller executes, before receiving the first information, a control for transmitting third information in the sidelink, and
the controller receives the first information from the another radio terminal having received the third information.

17. The radio terminal according to claim 11, wherein
the controller shares a dedicated resource used in the sidelink, with the another radio terminal, and
the dedicated resource is a radio resource allocated individually from a base station to the another radio terminal.

18. The radio terminal according to claim 11, wherein
a plurality of control regions used for transmitting control information are arranged in a time direction,
the control information is used for identifying a location of a radio resource in which user data transmitted in a sidelink is arranged, and
the controller executes a sidelink DRX (Discontinuous Reception) operation for discontinuously monitoring the plurality of control regions.

19. The radio terminal according to claim 11, wherein
the controller executes a control for receiving power control information from the another radio terminal,
the power control information includes parameter information for controlling a transmission power of a sidelink signal from the radio terminal to the another radio terminal, and
the parameter information is decided according to a received power of the sidelink signal from the another radio terminal to the radio terminal.

20. The radio terminal according to claim 11, wherein
the controller executes a control for receiving power control information from the another radio terminal,
the power control information includes command information for controlling a transmission power of a sidelink signal from the radio terminal to the another radio terminal, and
the command information is decided according to a received power of the sidelink signal.

\* \* \* \* \*